(12) United States Patent
Mueller et al.

(10) Patent No.: US 10,655,536 B1
(45) Date of Patent: May 19, 2020

(54) ENGINE

(71) Applicant: Polaris Industries Inc., Medina, MN (US)

(72) Inventors: Sven Mueller, Saint Paul, MN (US);
Craig M. Beach, Lakeville, MN (US);
Cal W. Johnson, Gem Lake, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 253 days.

(21) Appl. No.: 15/603,636

(22) Filed: May 24, 2017

(51) Int. Cl.
*F01M 13/00* (2006.01)
*F02B 75/22* (2006.01)
*F02B 75/32* (2006.01)
*F16H 57/00* (2012.01)

(52) U.S. Cl.
CPC ......... *F02B 75/22* (2013.01); *F01M 13/0011* (2013.01); *F02B 75/32* (2013.01); *F01M 2013/0044* (2013.01); *F16H 57/0025* (2013.01)

(58) Field of Classification Search
CPC ..... F02B 75/22; F01M 13/0011; F01M 13/00; F01M 2013/0038; F01M 2013/0044; F01M 2013/005; F01M 2013/0433; F01M 2013/045; F01M 2013/0461; F01M 2013/0494; F02M 35/10222
See application file for complete search history.

(56) References Cited

U.S. PATENT DOCUMENTS

| | | |
|---|---|---|
| 1,988,693 A | 1/1935 | MacLeod |
| 3,978,829 A | 9/1976 | Takahashi et al. |
| 4,011,921 A | 3/1977 | Sakamoto |
| 4,996,768 A | 3/1991 | Seyller |
| 5,279,391 A | 1/1994 | Ward |
| 6,499,956 B2 | 12/2002 | Nakamura |
| 6,510,912 B1 | 1/2003 | Atsuumi |
| 6,598,705 B2 | 7/2003 | Ito et al. |
| 6,666,183 B2 | 12/2003 | Abe et al. |
| 6,772,824 B1 | 8/2004 | Tsuruta |
| 6,789,522 B2 | 9/2004 | Seymour |
| 7,040,454 B2 | 5/2006 | Kawamoto et al. |
| 7,178,498 B2 | 2/2007 | Takeuchi |
| 7,240,657 B2 | 7/2007 | Watanabe |
| 7,987,936 B2 | 8/2011 | Yamakura |
| 8,006,792 B2 | 8/2011 | Nakao |
| 8,011,342 B2 | 9/2011 | Bluhm |

(Continued)

OTHER PUBLICATIONS

RD-300-16-6061-L, www.burnsstainless.com/rd-300-400-16-6061-1.aspx, available as early as May 20, 2016; 2 pages.

(Continued)

*Primary Examiner* — Jacob M Amick

(74) *Attorney, Agent, or Firm* — Faegre Drinker Biddle & Reath LLP

(57) ABSTRACT

An engine is disclosed of the V-configuration having an integrated engine and transmission. The engine has an engine ventilation system communicating between the crankcase and an upper end of the valve cover, whereby blow-by gases can be returned to the air intake system to recycle the unspent fuel. The engine also includes an easily accessible/removable cam, such that the camshaft may be removed without removing the rocker arms. The engine also includes a lubrication system for lubricating components of the engine and transmission.

31 Claims, 35 Drawing Sheets

(56) References Cited

U.S. PATENT DOCUMENTS

| | | |
|---|---|---|
| 8,122,990 B2 | 2/2012 | Suzuki |
| 8,128,358 B2 | 3/2012 | McLennan |
| 8,269,457 B2 | 9/2012 | Wenger |
| 8,672,077 B2 | 3/2014 | Sand |
| 9,216,789 B2 | 12/2015 | Hamlin et al. |
| 9,394,859 B2 | 7/2016 | Parnofiello |
| 9,421,860 B2 | 8/2016 | Schuhmacher |
| 9,810,111 B2 | 11/2017 | Sotani et al. |
| 2002/0073980 A1 | 6/2002 | Abe et al. |
| 2004/0226531 A1 | 11/2004 | Kino et al. |
| 2004/0244761 A1 | 12/2004 | Takeuchi |
| 2004/0245050 A1 | 12/2004 | Kawamoto et al. |
| 2005/0217909 A1 | 10/2005 | Guay et al. |
| 2006/0113133 A1 | 6/2006 | Berkovic |
| 2006/0288976 A1 | 12/2006 | Watanabe |
| 2008/0073980 A1 | 3/2008 | Wang et al. |
| 2008/0218018 A1 | 9/2008 | Zhang et al. |
| 2010/0012074 A1 | 1/2010 | Asaya |
| 2010/0078242 A1 | 4/2010 | Suzuki |
| 2010/0095922 A1* | 4/2010 | Nakajima .......... F01M 13/0416 123/196 A |
| 2010/0193275 A1 | 8/2010 | Song et al. |
| 2010/0243352 A1 | 9/2010 | Watanabe et al. |
| 2011/0240392 A1 | 10/2011 | Iwata |
| 2012/0073527 A1 | 3/2012 | Oltmans |
| 2012/0247418 A1 | 10/2012 | Tanaka et al. |
| 2013/0074815 A1* | 3/2013 | Yuge ................... F01M 13/023 123/574 |
| 2013/0118444 A1 | 5/2013 | Harada |
| 2014/0261258 A1 | 9/2014 | Fronk |
| 2014/0262580 A1 | 9/2014 | Bagnariol |
| 2014/0291051 A1 | 10/2014 | Yoshida |
| 2014/0360448 A1 | 12/2014 | Chittenden |
| 2015/0129342 A1 | 5/2015 | O'Rourke et al. |
| 2015/0275719 A1* | 10/2015 | Nakama ............... F01M 13/022 123/573 |
| 2015/0308299 A1 | 10/2015 | Dautel et al. |
| 2016/0017841 A1 | 1/2016 | Harada |
| 2016/0075393 A1 | 3/2016 | Eder |
| 2017/0021719 A1 | 1/2017 | Jyouzaki |
| 2017/0089308 A1 | 3/2017 | Yamashita et al. |
| 2018/0010558 A1 | 1/2018 | Matsuda et al. |

OTHER PUBLICATIONS

Part Finder for 2015 Vision, Polaris Industries, Inc., copyright 2009; 7 pages.

Part Finder for 2015 Cross Country, Polaris Industries, Inc., copyright 2010; 7 pages.

Harley-Davidson Electronic Throttle Control, Rider Magazine, dated Feb. 12, 2009, http://ridermagazine.com/2009/02/12/2008-h-d-electronic-throttle-control/; 3 pages.

* cited by examiner

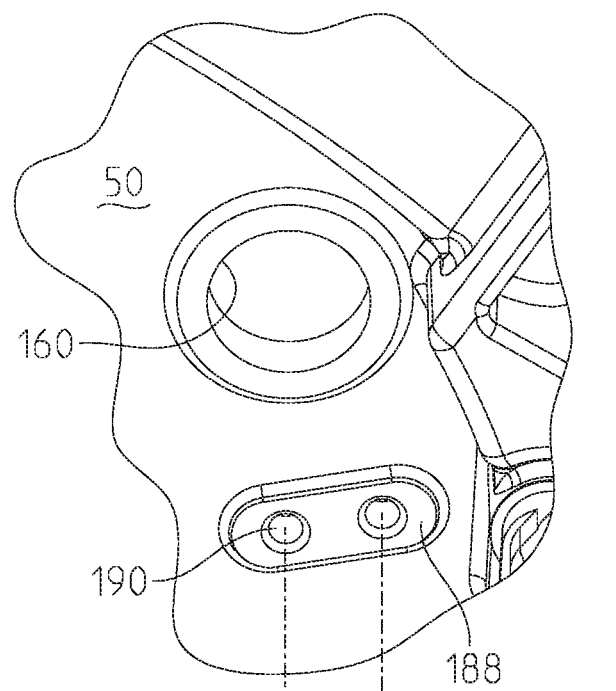
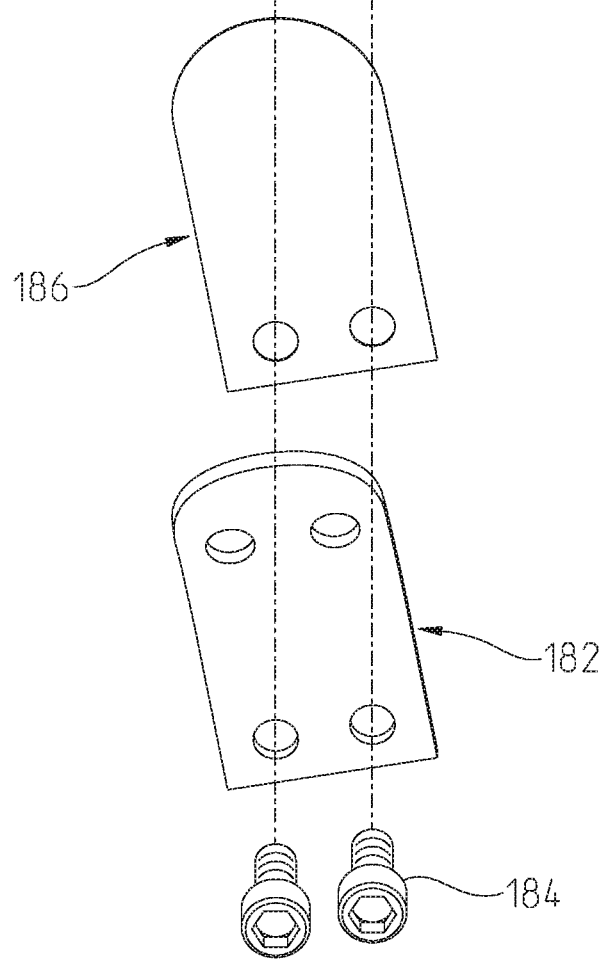
Fig. 12

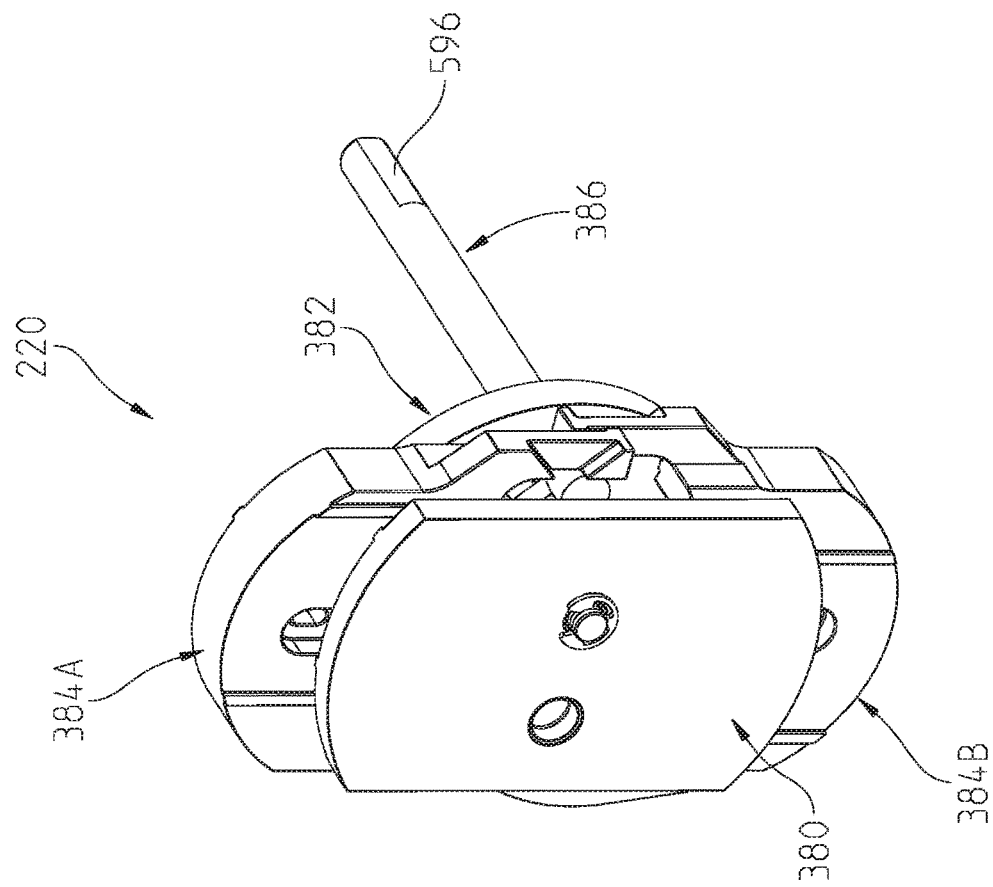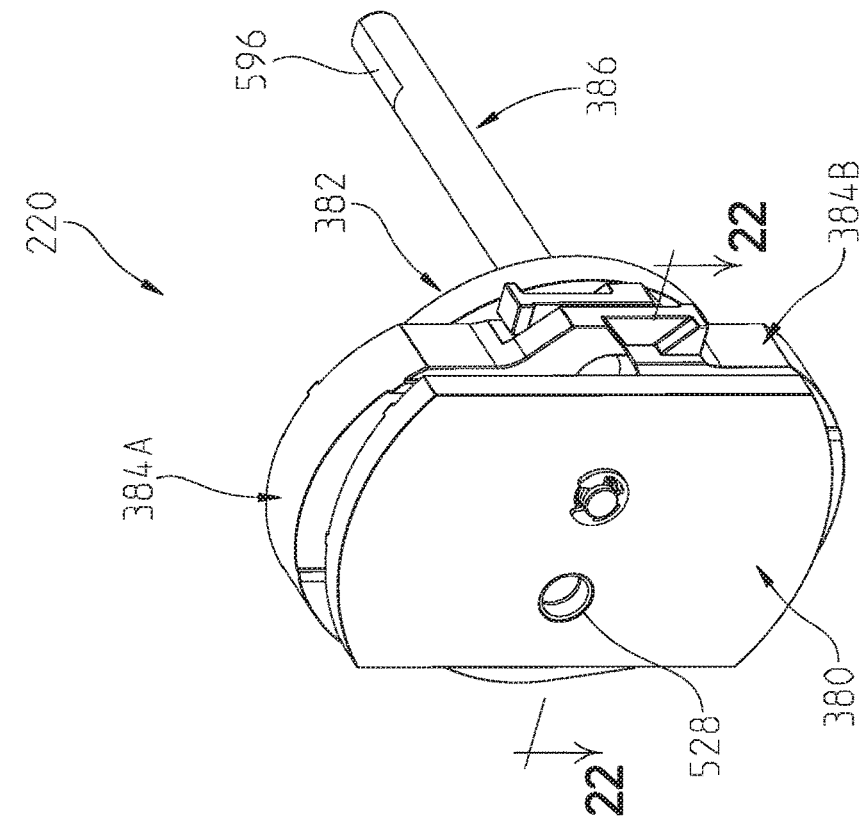

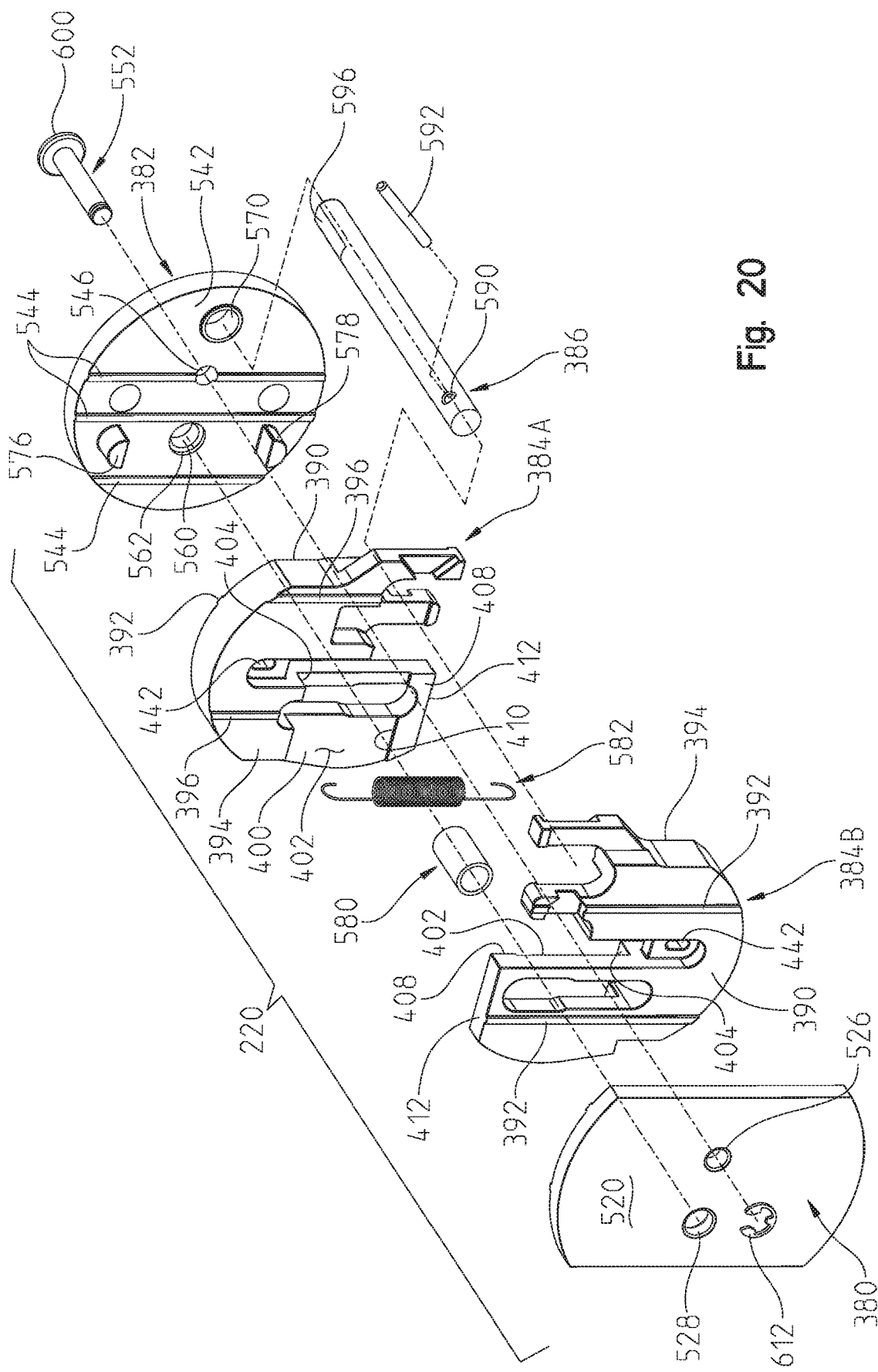

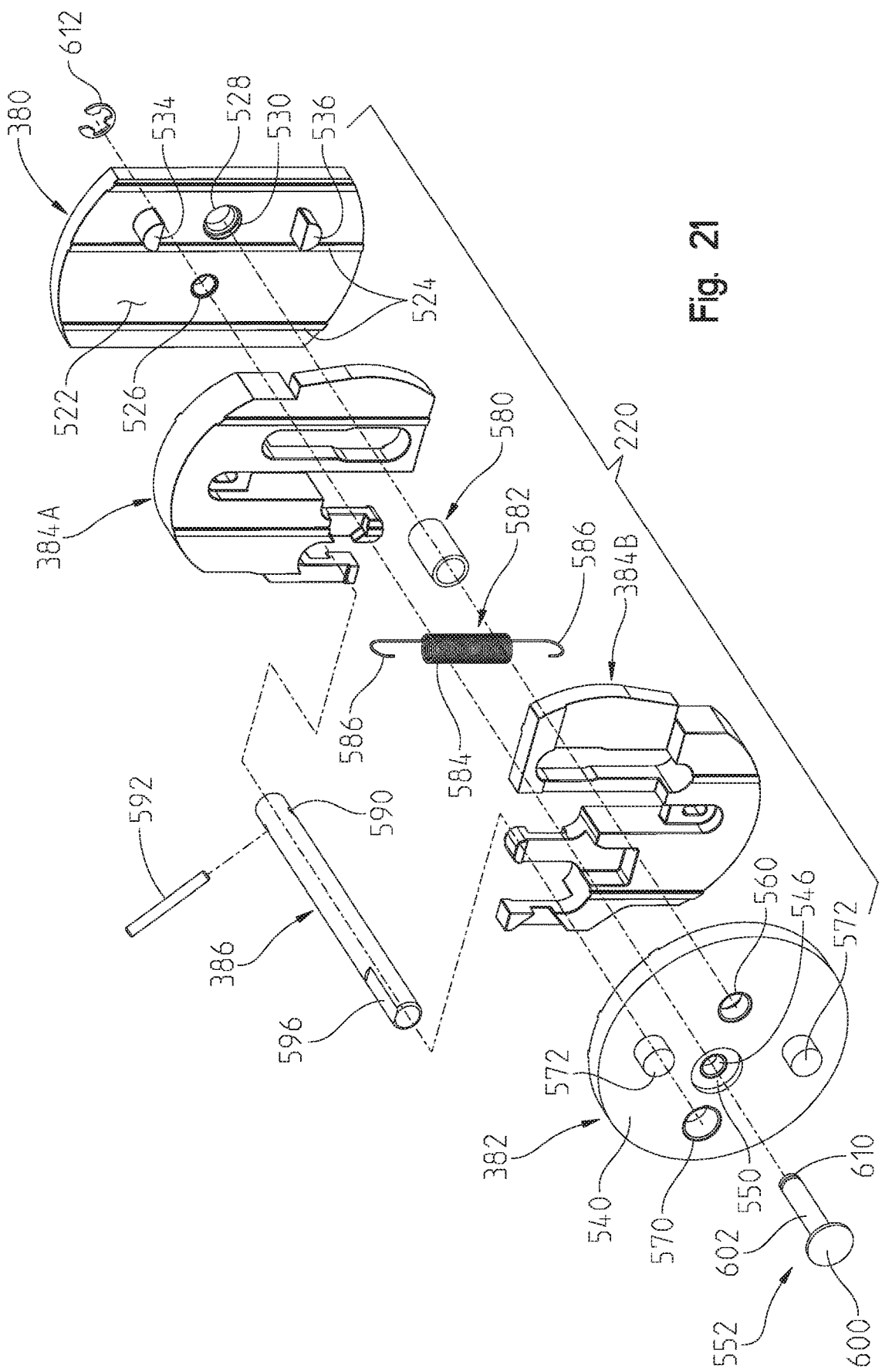

ENGINE

BACKGROUND OF THE DISCLOSURE

The present disclosure generally relates to an engine and more particularly to an engine having improved serviceability and emissions.

Multiple different engine types are known, for example, multiple fuel types are available, and multiple different sized engines are available, together with different numbers of cylinders. Engines may also be 2 or 4 stroke, and have cylinders positioned at multiple different orientations, for example the piston(s) may be oriented vertically, horizontally, in a V-configuration (V-twin) or at any other possible orientation. The engine may also be incorporated into a powertrain including an integrated transmission. The subject disclosure is applicable to all types of such engines.

Some engines are shown for example in U.S. Pat. Nos. 8,011,342 and 8,269,457; and in patent application Ser. No. 13/242,239 filed Sep. 23, 2011 (US Publication Number 20120073527); and Ser. No. 14/214,033 filed Mar. 14, 2014 (US Publication Number 20140261258); the disclosures of which are expressly incorporated herein by reference.

SUMMARY OF THE DISCLOSURE

In one embodiment, an engine comprises a crankcase; a crankshaft journaled in the crankcase; a piston coupled to the crankshaft; a cylinder in which the piston reciprocates, a head positioned over the piston and cylinder; a valve cover receivable over the head; and a blow-by gas outlet coupled to the valve cover and communicating through the valve cover, the head, the cylinder and the crankcase to exhaust blow-by gas from the crankcase.

In another embodiment, an engine comprises a crankcase; a crankshaft journaled in the crankcase; a piston coupled to the crankshaft; a cylinder in which the piston reciprocates, a head positioned over the piston and cylinder; 8a valve cover receivable over the head; and a channel defined through the valve cover, the head, the cylinder and the crankcase to exhaust blow-by gas from the crankcase.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 12 shows an enlarged view of the reed valve shown in FIG. 11;

FIG. 19A shows the cylinder decompression device in the de-activated state;

FIG. 19B shows the cylinder decompression device in the activated state;

FIG. 20 is an exploded view of the device of FIGS. 19A and 19B;

FIG. 21 is a view similar to that of FIG. 20, but from the opposite perspective;

DETAILED DESCRIPTION OF THE DRAWINGS

Figure 1:
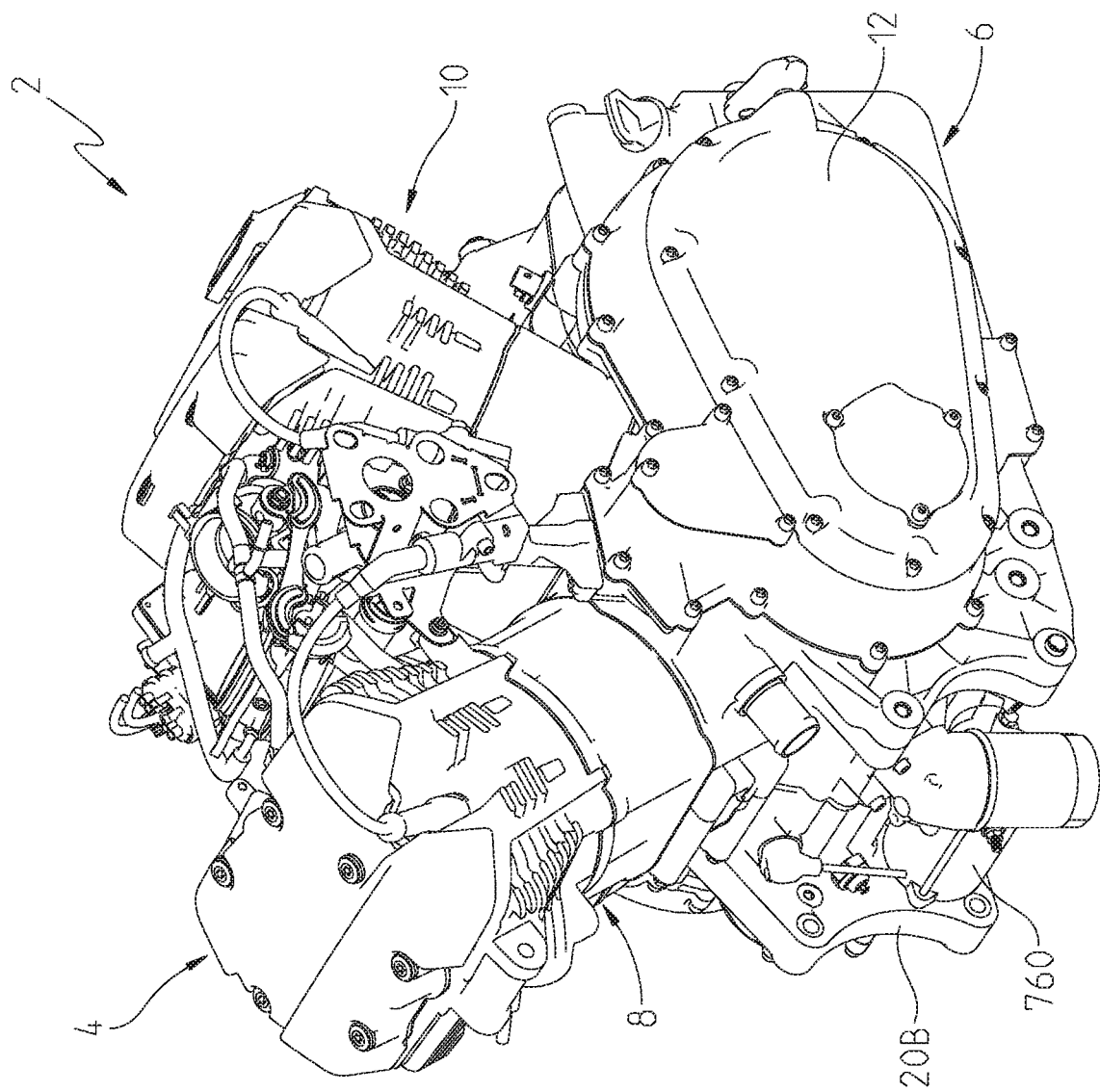
FIG. 1 is a front left perspective view of the power train.
Figure 2:
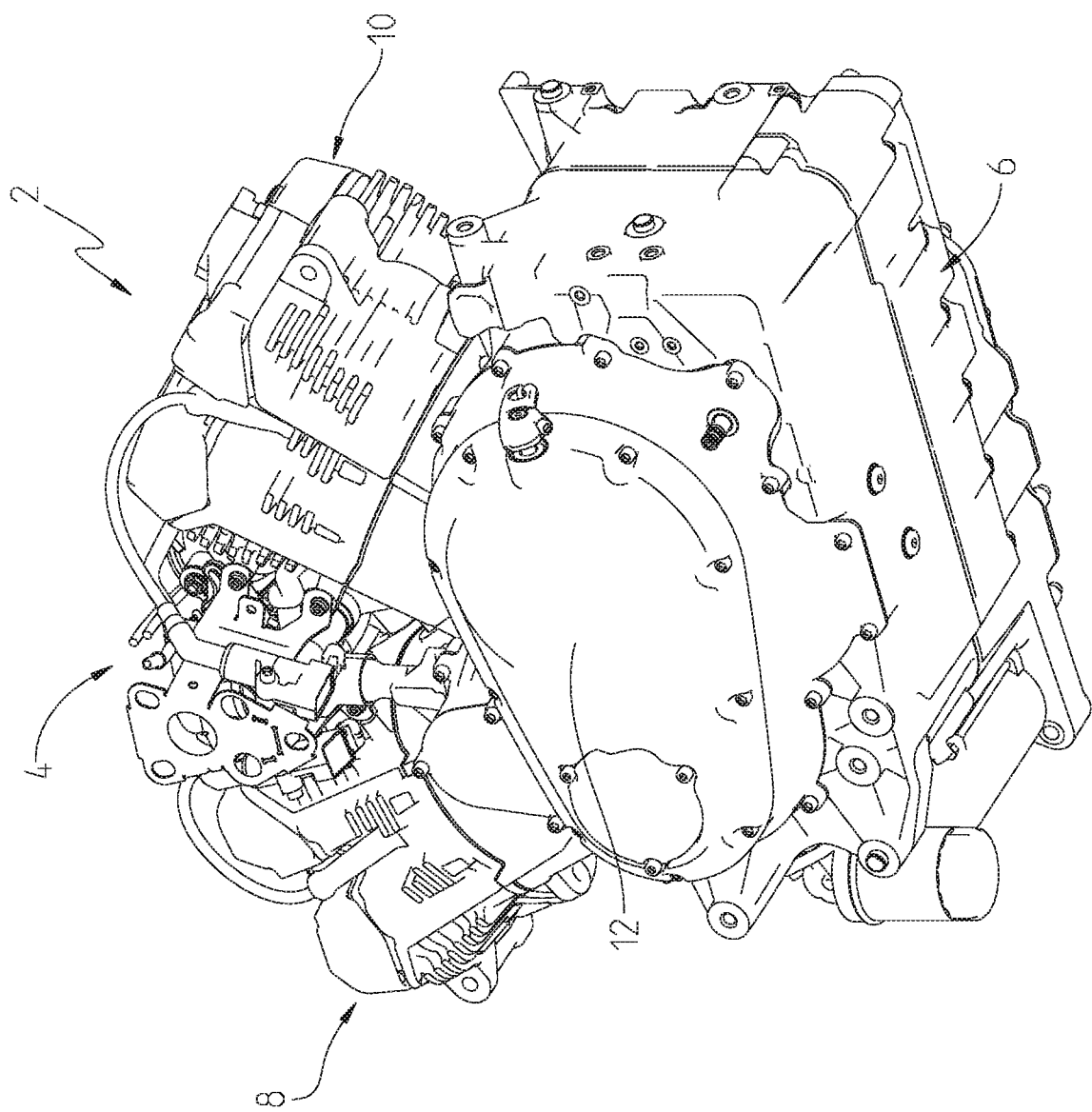
FIG. 2 is a rear left underside perspective view of the power train of FIG. 1.

Corresponding reference characters indicate corresponding parts throughout the several views. Unless stated otherwise the drawings are proportional. The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a motorcycle engine it should be understood that the features disclosed herein may have application to other power sports vehicles as well, such as ATVs, snowmobiles, utility vehicles, watercraft, etc.

Figure 3:
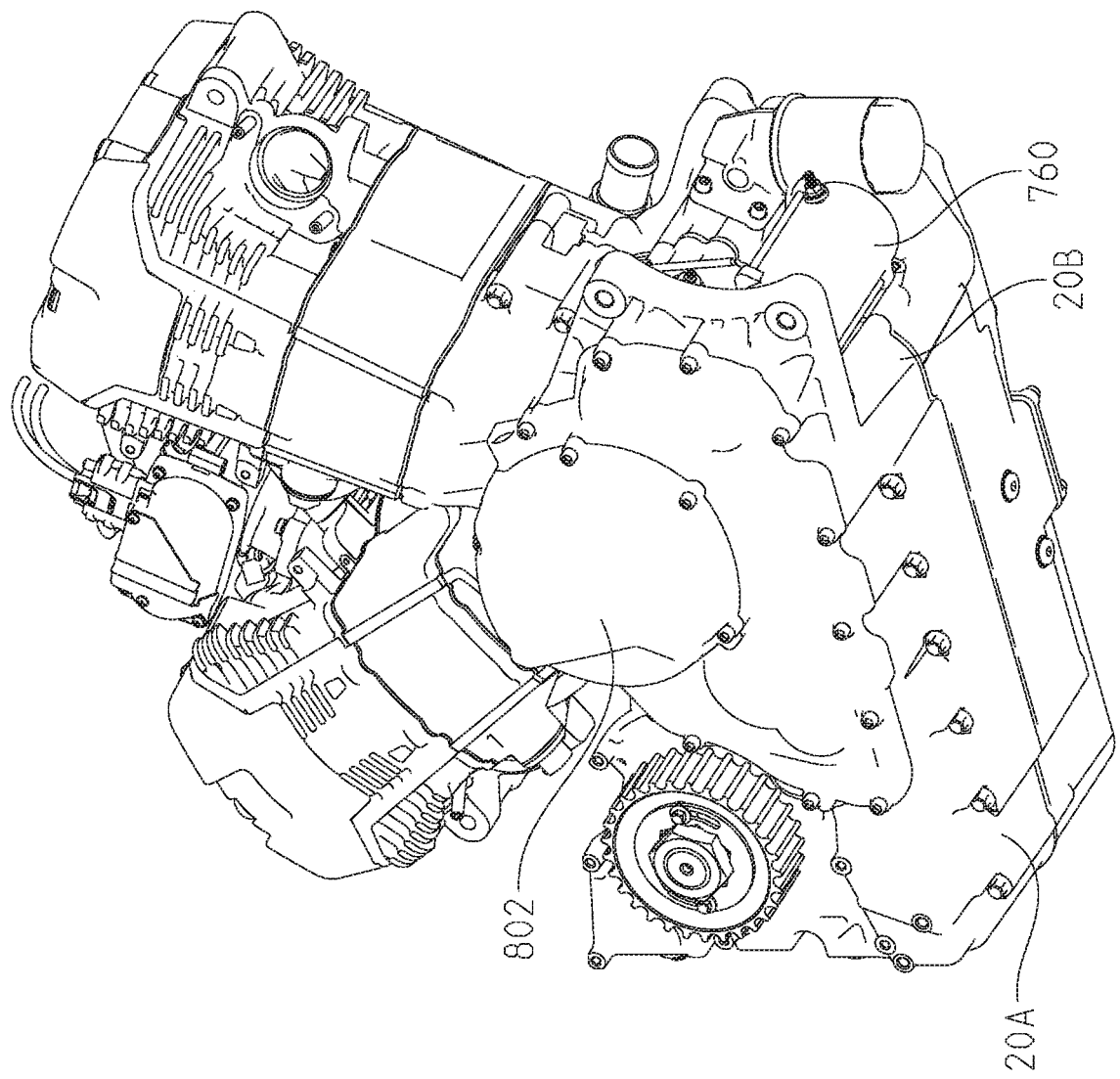
FIG. 3 is a front right underside perspective view of the power train of FIGS. 1-2.
Figure 4:
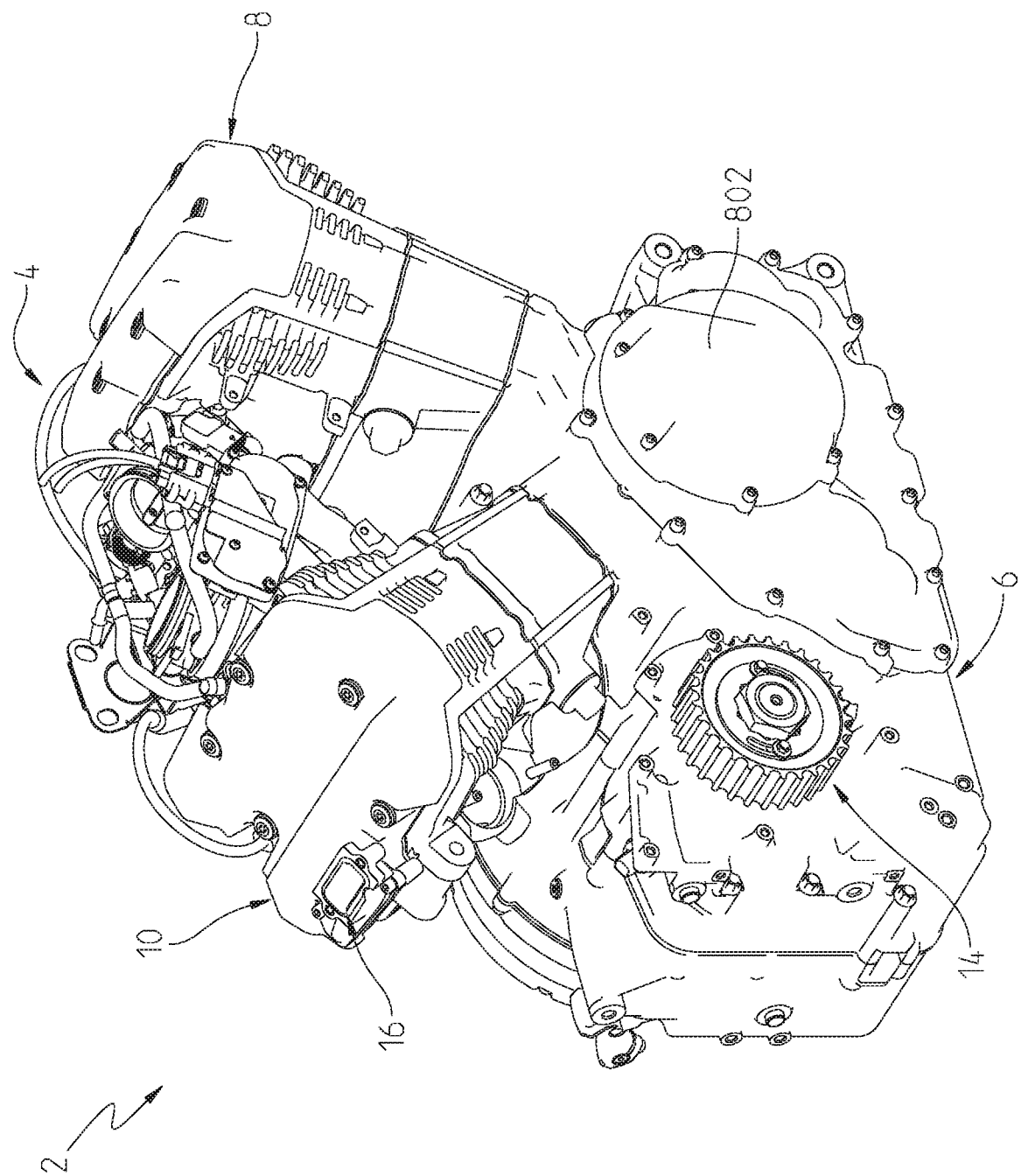
FIG. 4 is a rear right perspective view of the power train of FIGS. 1-3.

With reference first to FIGS. 1-4, a power train is shown generally at 2. Power train 2 is intended for a motorcycle, but could be used as a power train for other vehicles as well. Power train 2 is a combination of an engine and a transmission in a single module, where the engine portion is shown at 4 and the transmission portion is shown at 6. Power train 2 includes a front cylinder assembly 8 and a rear cylinder assembly 10. Clutch cover 12 (FIGS. 1 and 2) covers a clutch 13 (FIG. 8) which is coupled to the power train and couples an output of the engine 4 with an input of the transmission 6 as is known in the art. As shown in FIG. 4 an output 14 of the transmission is provided as a sprocket. In the case of a motorcycle, sprocket 14 would drive a drive belt (not shown) which in turn would drive a rear wheel of the motorcycle.

As also shown in FIG. 4, an engine ventilation system is shown at 16, which communicates with the crankcase to expel blow-by gases from the crankcase and return them to the air intake system for cleaner burning of the unspent fuel. With reference now to FIGS. 5-12, the engine ventilation system 16 will be described in greater detail.

Figure 9:
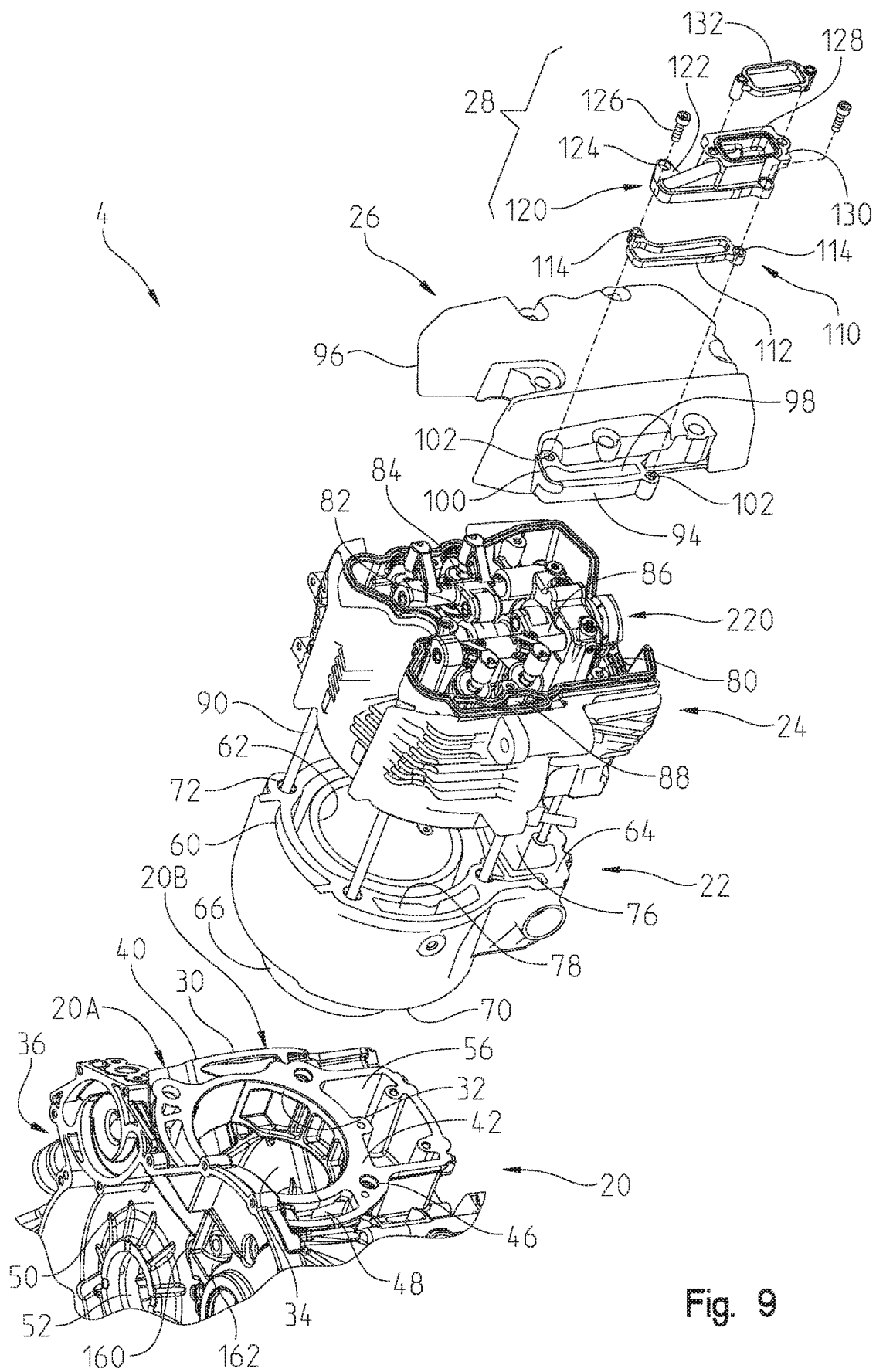
FIG. 9 is an exploded view of the block, cylinder, head and valve cover of the rear cylinder and head of FIG. 5.

With reference first to FIG. 9, the major components of engine 4 are shown exploded away from each other and include an engine block 20, cylinder 22, head 24, valve cover 26 and blow-by gas outlet 28 of engine ventilation system 16. As shown, cylinder block 20 is comprised of cylinder block halves 20A and 20B which couple together at seam 30 to provide a unified engine block. As shown, engine block 20 defines an enlarged opening at 32 for receipt of cylinder 22 and for access to the crankcase 34. Engine block 20 further includes an integral water pump housing 36 positioned intermediate the two cylinders for cooling of the engine. Cylinder block 20 includes an upper face 40 for receipt of the front cylinder and a rear face 42 for receiving the rear cylinder 22. It should be appreciated that only one blow-by gas outlet 28 is provided for both of the two cylinders as it couples with the crankcase 34 as described herein. Engine block 20 further includes tapped apertures at 46 which extend through faces 40 and 42. An outlet port 48 is defined extending through face 42 which communicates with crankcase 34 as described herein. Engine block 20 includes an outer wall at 50 including an opening at 52 for receipt of an output shaft as further described herein. Engine block 20 further includes a passageway at 56 which communicates with a portion of a crankshaft for driving the cam shaft as further described herein.

With reference still to FIG. 9, cylinder 22 is provided by a generally cylindrical configuration 60 having an internal cylinder liner at 62 extending to a top surface 64 and extending downwardly to a liner portion 66. It should be appreciated that an outer diameter of the liner portion 66 is slightly smaller than the inner diameter of aperture 32 for receipt of the liner into engine block 20. Cylinder 22 further includes a downwardly facing shoulder at 70 which is profiled to be received adjacent face 42 with a gasket therebetween as is known in the art. Cylinder 22 further includes a plurality of apertures at 72 which align with apertures 46 in block 20. A passageway 76 aligns with passageway 56 of cylinder block 20 as will be described herein. Cylinder 22 further includes a port at 78 which communicates with port 48 on engine block 22 and resultantly communicates with crankcase 34.

With reference still to FIG. 9, head 24 is receivable over cylinder 22 and includes a plurality of apertures at 80 which correspond to apertures 72 of cylinder 22. As shown, head 24 includes a cam 82, rocker arm assemblies 84, 86 and a port 88. It should be appreciated that port 88 extends through head 24 to communicate with port 78 and port 48 of cylinder block 20 and with crankcase 34, as described herein.

As shown in FIG. 9, a plurality of studs 90 are shown which are threaded at both ends. It should be appreciated that the assembly of the block 20, cylinder 22 and head 24 would begin by threadably engaging the threaded ends of the studs 90 with the threaded apertures 46 of the cylinder block 20 such that the studs upstand from the face 42 of the cylinder block 20. A head gasket would then be placed over the studs and would provide a similar interface as face 42 including cutouts for apertures 46 and port 48. Head 22 would then be insertable over the studs with apertures 72 aligned with the studs and with passageway 76 aligned with passageway 56. Another gasket would then be placed over the top of head 22 with similar apertures therethrough for alignment with the apertures 72 and port 78. Head 24 would then be positioned with the alignment of apertures 80 over the studs 90 whereupon a further fastener, such as a nut, could be threadably engaged with the second threadable end of the studs 90 whereupon the head, the cylinder, and the gaskets could be drawn down to the cylinder block in sealing engagement therewith.

Valve cover 26 provides a lower peripheral edge at 96 which cooperates with the top of head 24 and further includes a flange portion at 94 which includes a port at 98 which communicates with port 88 of head 24. Flange portion 94 includes an upper peripheral edge at 100 having two tapped apertures at 102 which provide an interface for outlet 28.

Outlet 28 includes a lower gasket at 110 which includes a peripheral portion 112 which cooperates with peripheral edge 100 of flange portion 94 and includes gasket through holes at 114 which cooperate with threaded apertures 102. An outlet body 120 includes a flanged portion 122 having apertures at 124 for receipt of fasteners 126. Outlet body 120 includes a port 128 extending through the outlet body 120 and communicates with port 98. Outlet body 120 includes an upper interface 130 which receives a gasket 132. It should be appreciated that the interface 130 and gasket 132 define an outlet interface for a hose or other conduit (not shown) which would then be returned to the air intake system of the motorcycle.

Figure 10:
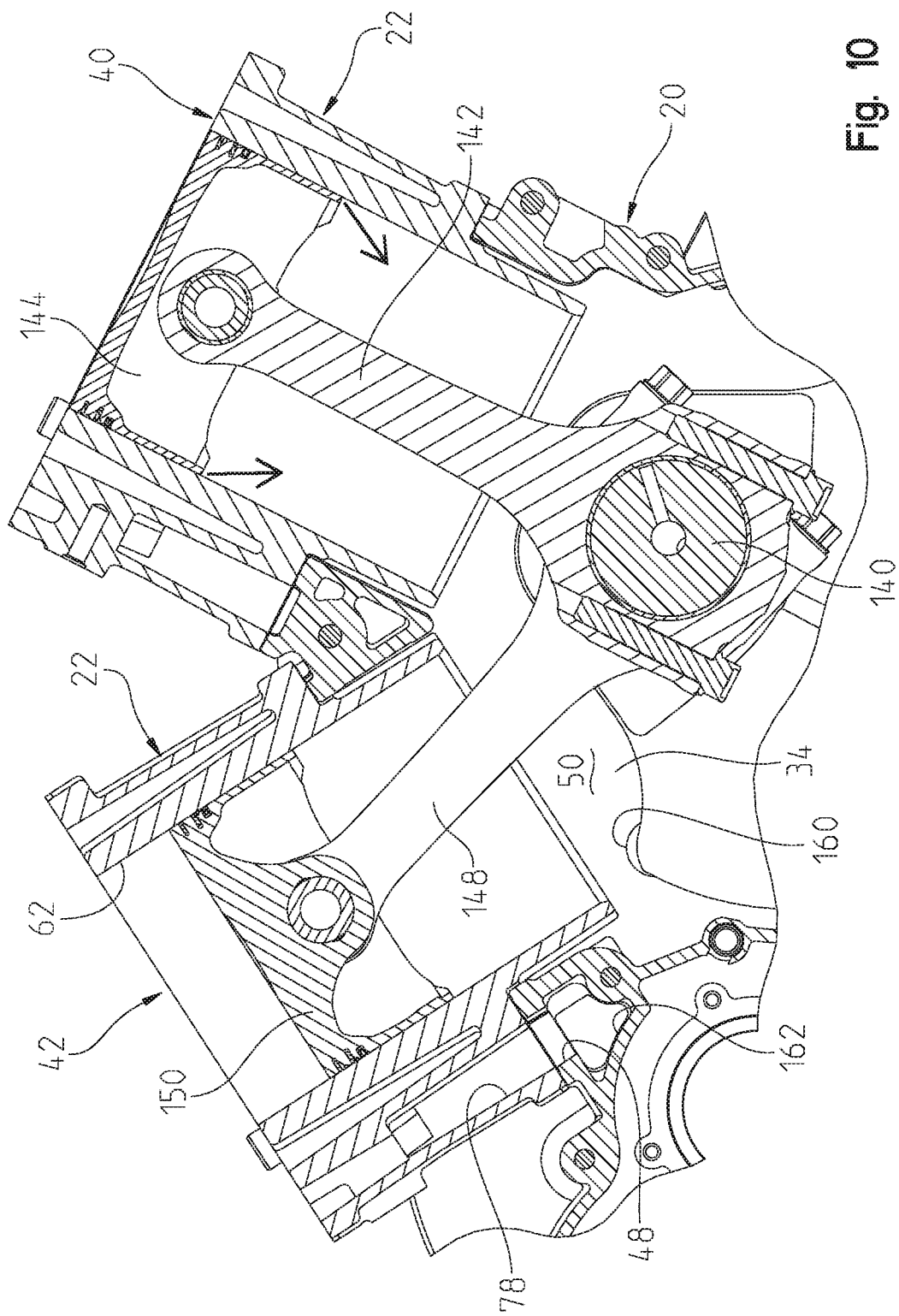
FIG. 10 shows a cross-sectional view through the front connecting rod.

With reference now to FIG. 10, a crankshaft is shown at 140 which is coupled to a front connecting rod 142 which in turn couples to a front piston 144. In a similar manner, a rear connecting rod 148 is coupled to crankshaft 140 which in turn couples to rear piston 150. With reference still to FIG. 10, a vent opening 160 is shown extending through wall 50 communicates which to an opposite side or outside of wall 50 (see FIG. 11). Meanwhile, a vent passageway 162 also communicates to the opposite side of wall 50 and with port 48, but does not communicate with the crankcase 34. More particularly, vent passageway 162 is shown in FIG. 10 as communicating with both ports 48 and 78, but an end wall 170 (FIG. 8) prevents access directly to the crankcase 34. As shown best in FIG. 11, aperture 160 is covered by a reed valve assembly 180 including a reed 182 coupled to inner wall 50 by way of fasteners 184. Seal 186 is positioned intermediate reed 182 and aperture 160 as shown best in FIG. 12. Wall 50 includes an embossed section 188 having threaded apertures at 190 for receiving fasteners 184 and coupling reed and reed seal 186 thereto. It should also be appreciated that the reed is springloaded in its normal state to be positioned against aperture 160 and thereby sealed shut. With reference now to FIGS. 7, 8, 10, and 11, the engine ventilation system 16 will be described in greater detail.

Figure 5:
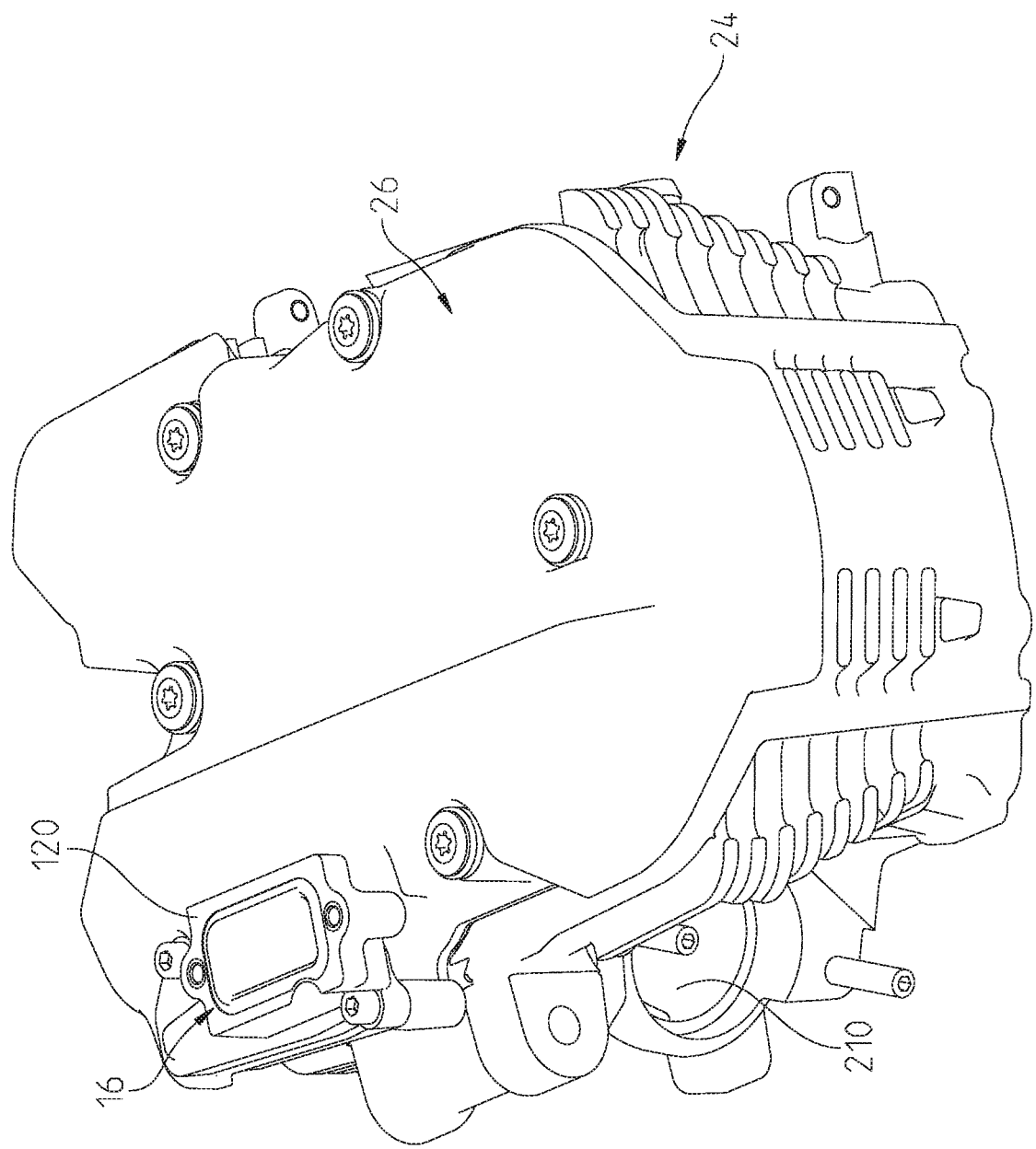
FIG. 5 is a right side perspective view of the rear cylinder and head of the power train of FIGS. 1-4.
Figure 6:
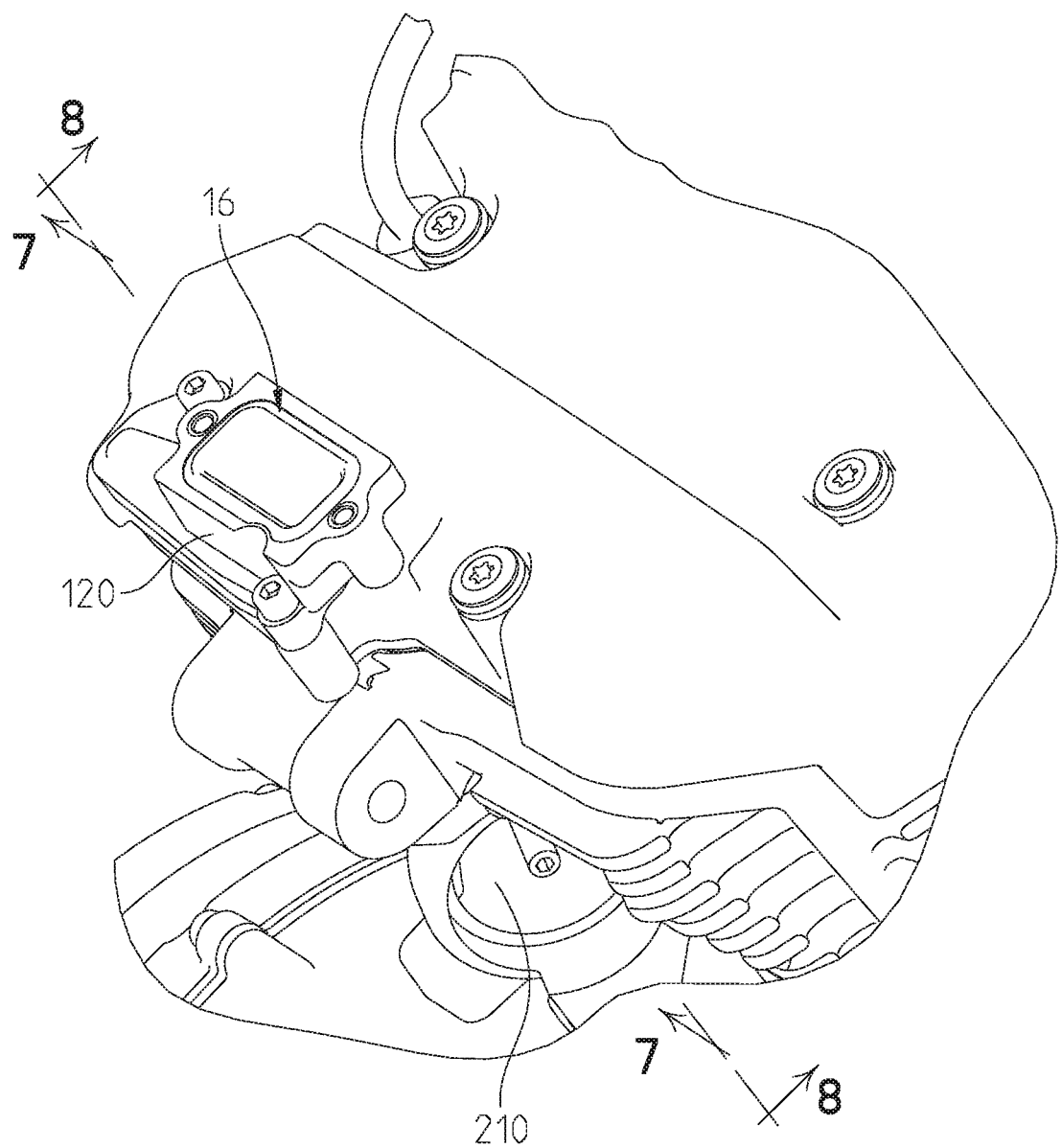
FIG. 6 is an alternate view of the rear cylinder and head of FIG. 5.
Figure 7:
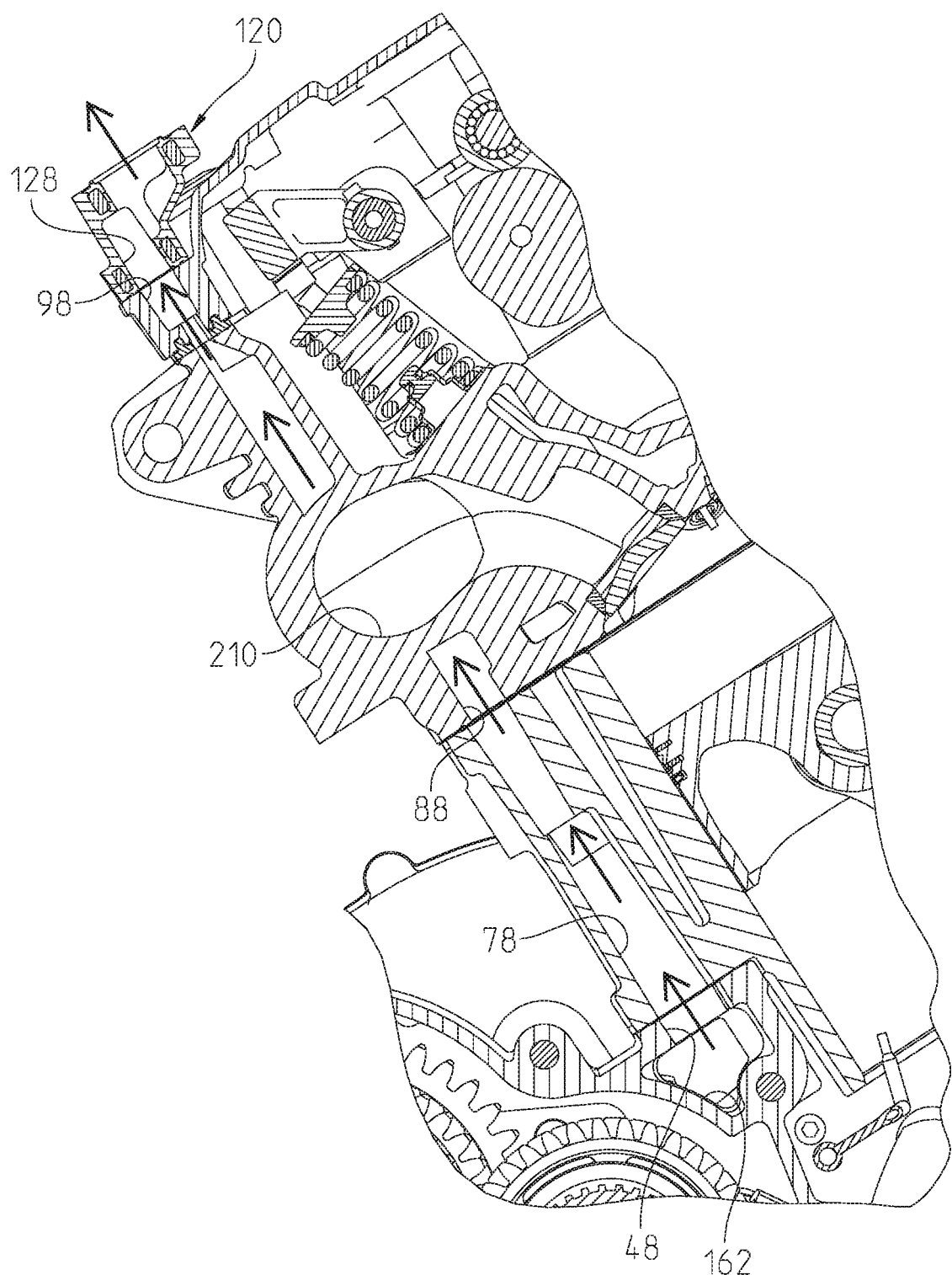
FIG. 7 is a cross-sectional view through lines 7-7 of FIG. 6.
Figure 8:
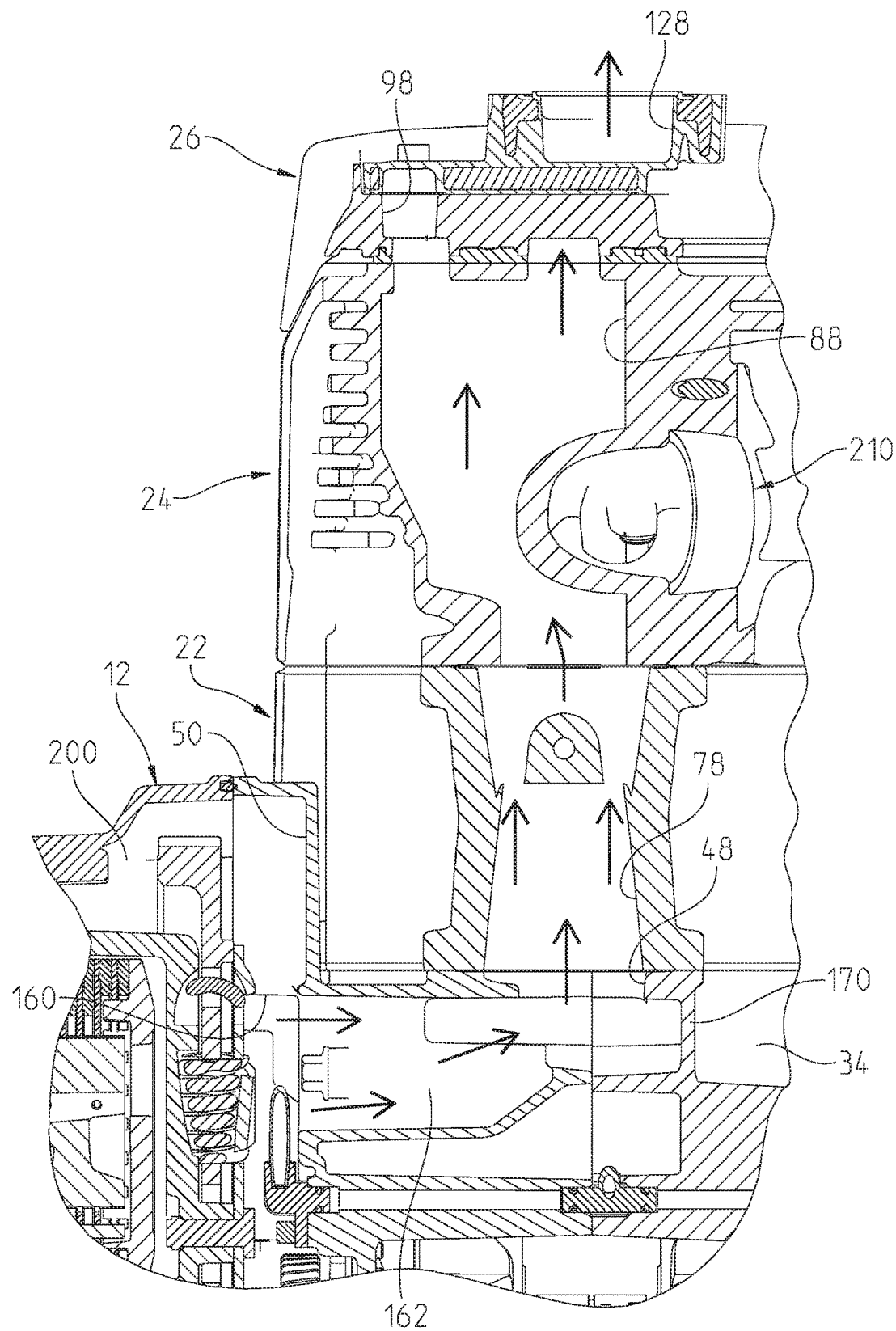
FIG. 8 is a cross-sectional view through lines 8-8 of FIG. 6.

With reference first to FIG. 10, blow-by gases enter crankcase 34 by way of escaping around one of the pistons 144, 150 while in the compression stroke (see arrows adjacent to front piston 144 in FIG. 10). At the same time, the crankcase is pressurized by way of the downstroke of the other piston, in this case, piston 150 which places pressure against reed valve 182, see FIG. 11. Reed valve 182 is shown in the open state in FIG. 11 such that blow-by gasses could escape from crankcase 34 into the area adjacent wall 50. This is the clutch enclosure 200 (see FIG. 8) which is enclosed by valve cover 12. Once blow-by gas escapes into clutch enclosure 200 the blow-by gas follows arrows shown in FIG. 11 into passageway 162 and exits port 48. From port 48, blow-by gas progresses upwardly through ports 78 (in cylinder 22) through port 88 (in head 24) and upwardly through ports 98 and 128 as shown best in FIGS. 7 and 8. FIGS. 5 and 6 show outlet 28 poised for interconnection to a hose or a conduit (not shown). FIGS. 6-8 show blow-by gas venting upwardly around exhaust manifold 210.

Figure 13:
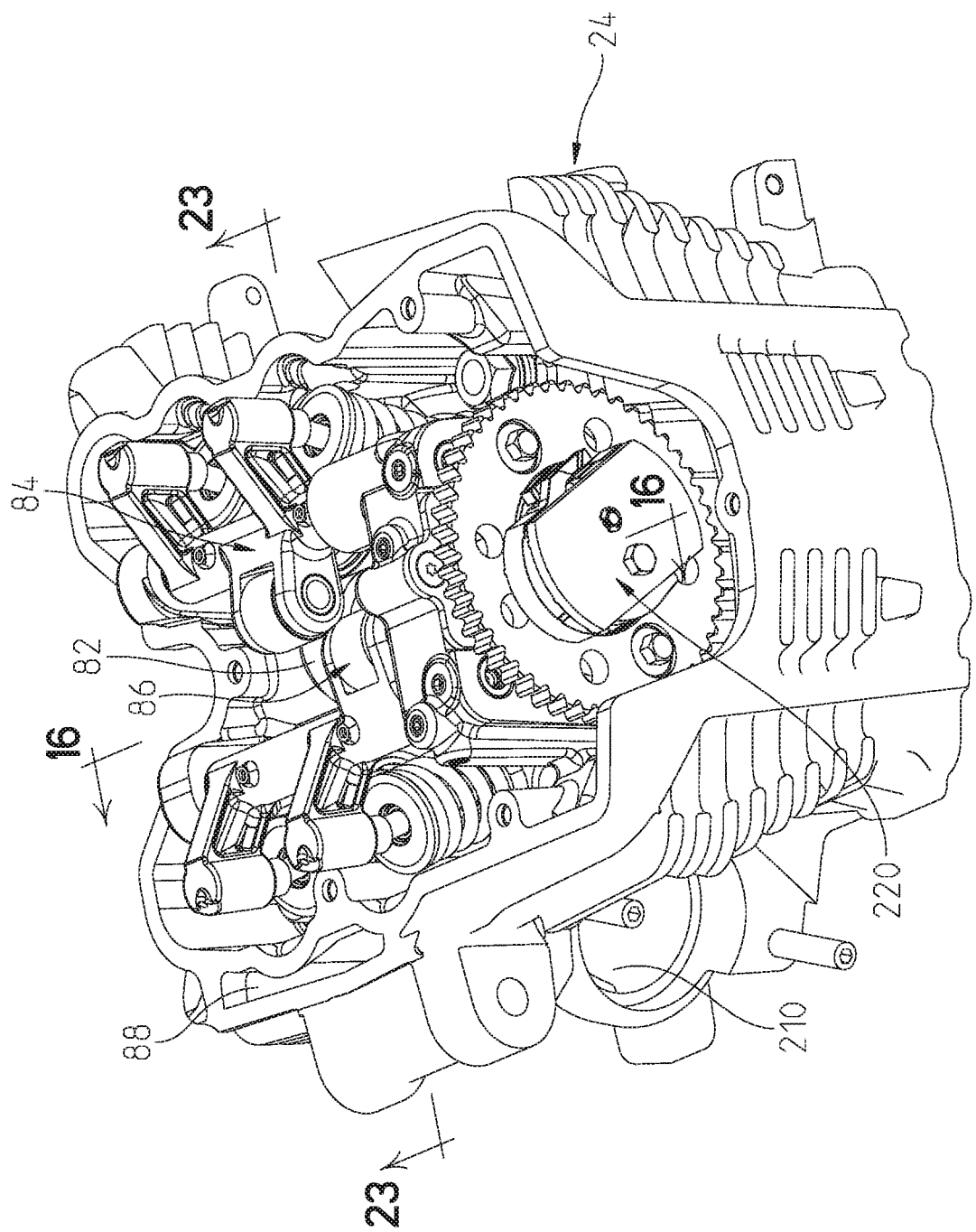
FIG. 13 is an upper perspective view of the cylinder head of the present disclosure.
Figure 14:
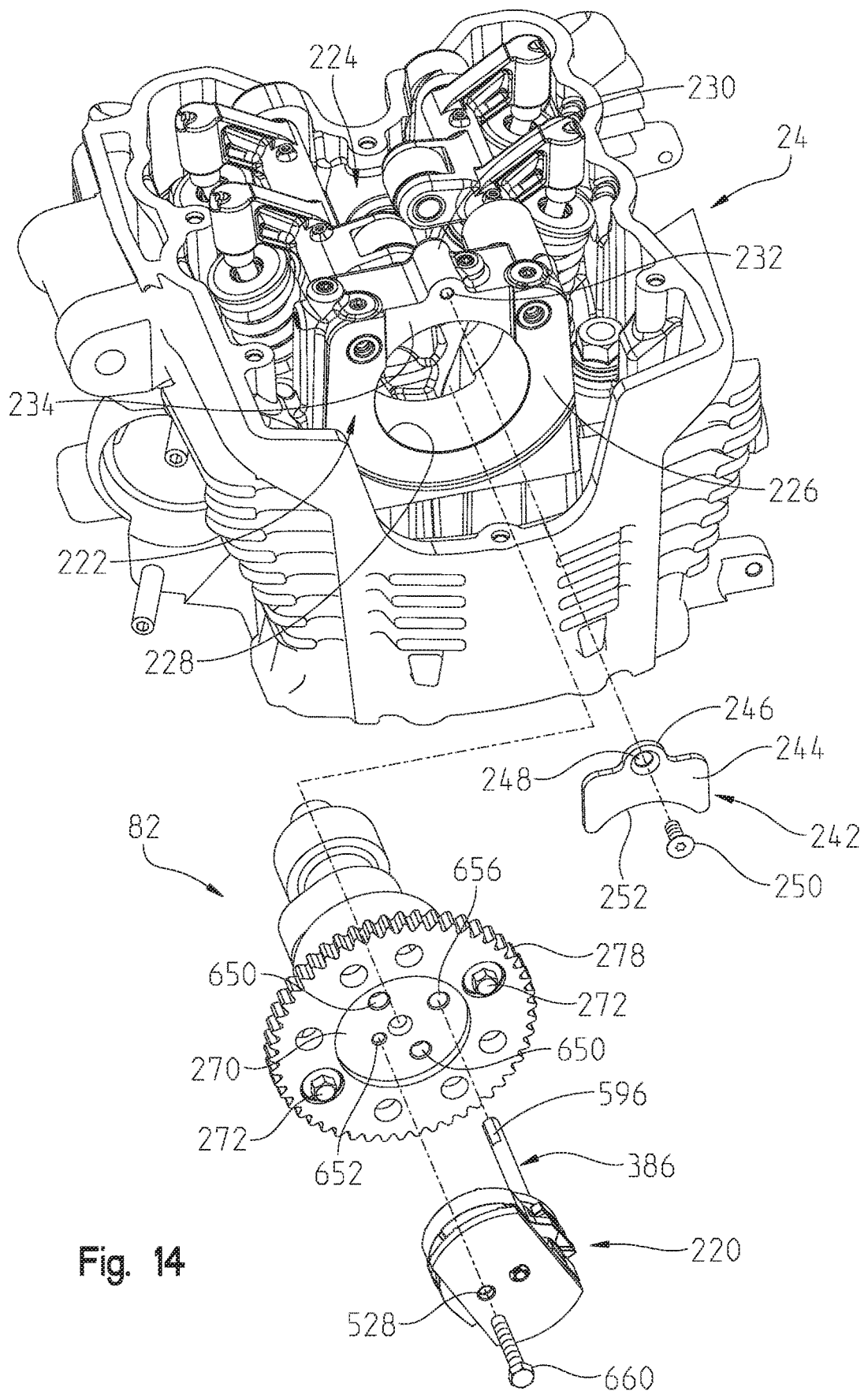
FIG. 14 is a view similar to that of FIG. 13, showing the cam removed.
Figure 15:
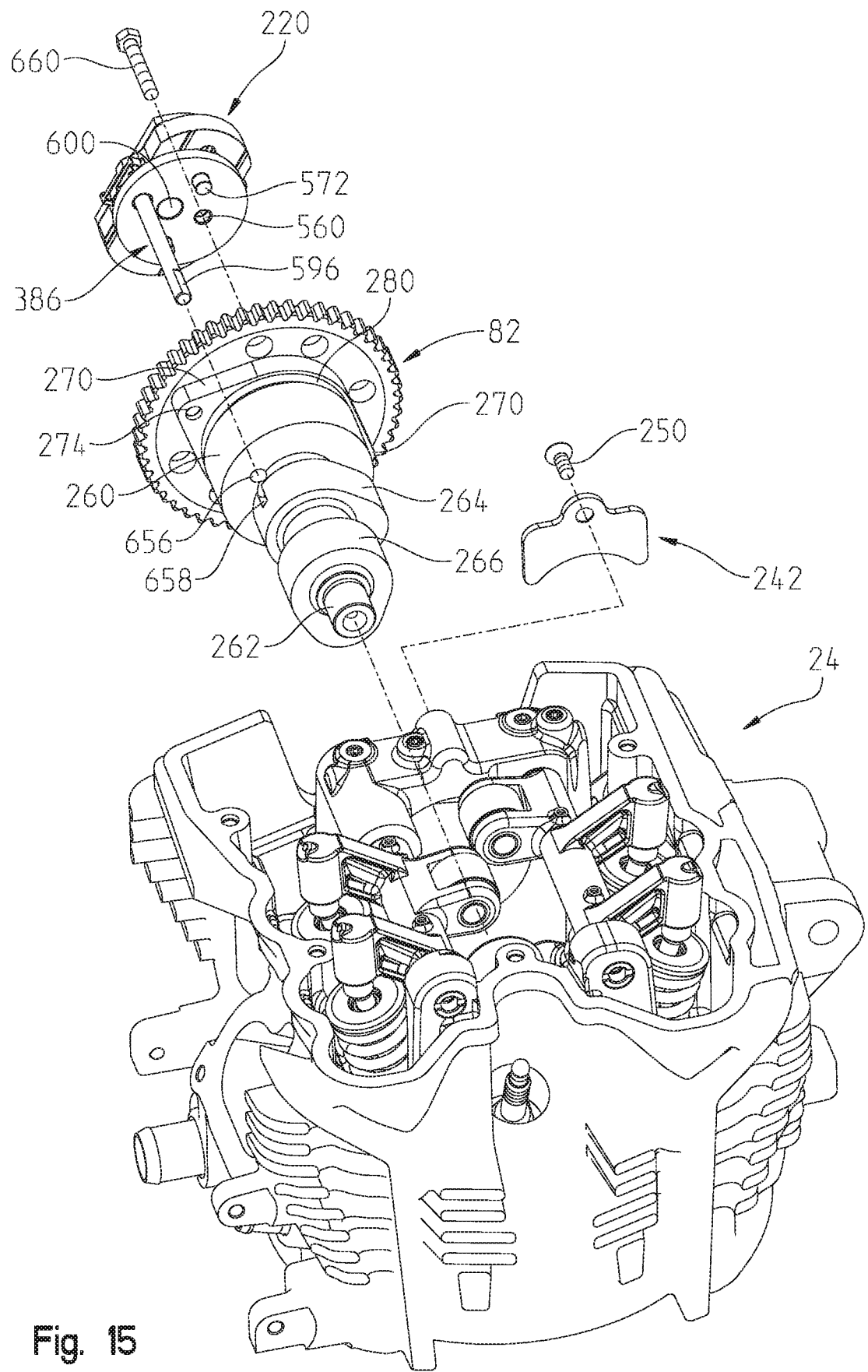
FIG. 15 is a view similar to that of FIG. 14, but from the opposite perspective.
Figure 16:
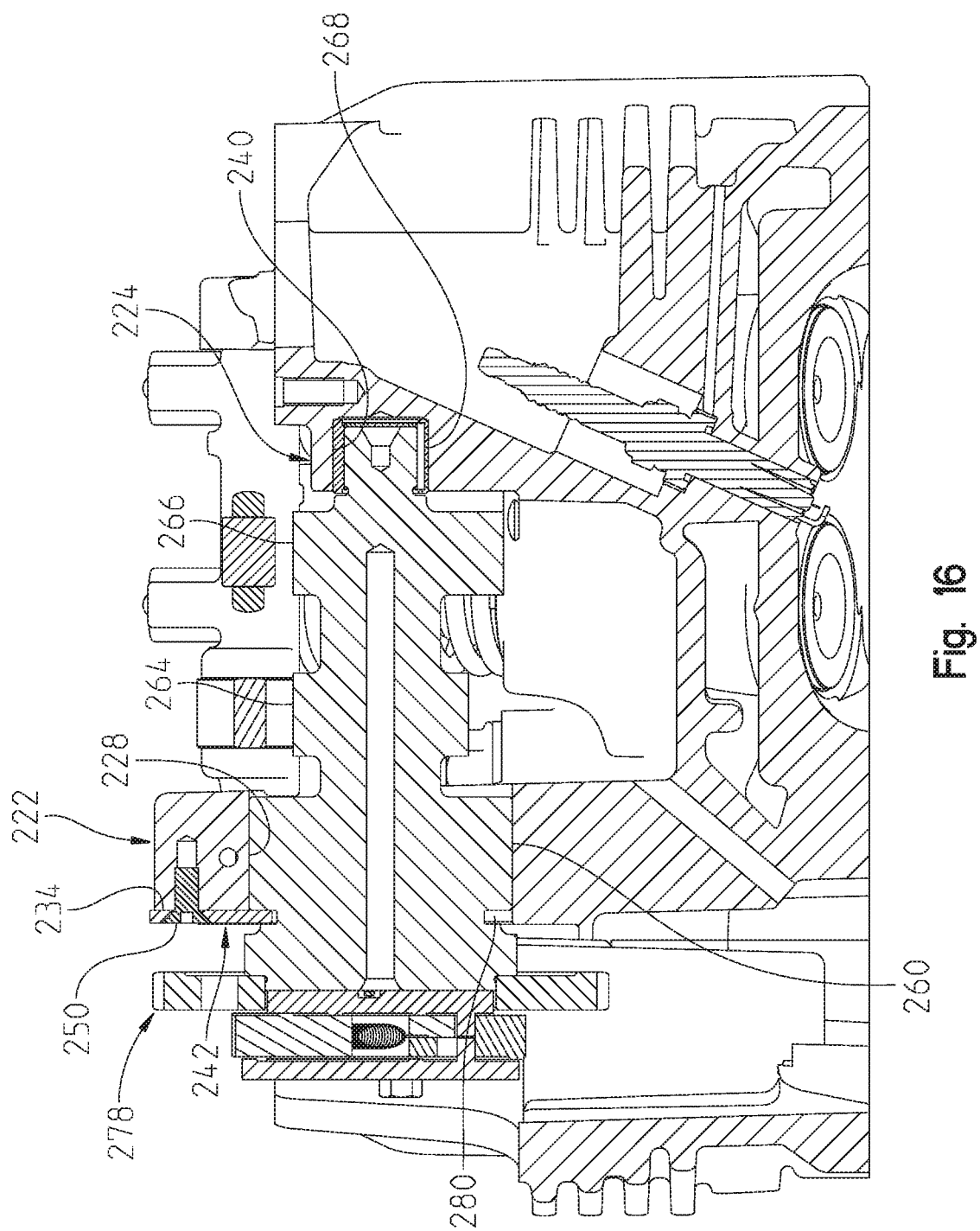
FIG. 16 is a cross-sectional view through the lines 16-16 of FIG. 13.

With reference now to FIGS. 13-16, the head 24 will be described in greater detail and in particular the design of the head and cam assembly allowing the cam to be removed without removing the rocker arms. With reference first to FIG. 13, head 24 is shown with rocker arms 84 and 86 flanking cam shaft 82. A decompression device 220 is positioned on an end of the cam shaft and will be described in greater detail herein. With reference to FIGS. 14 and 15, cam shaft 82 is shown exploded away from the head 24. Cam shaft 82 is held or journaled in journals 222 and 224 (FIG. 14). Journal 222 is defined by an upstanding wall 226 having an opening at 228. Wall 226 includes an upper boss at 230 having a threaded aperture 232. A front face of wall 226 includes a recess at 234. Wall 224 includes an opening at 240 (FIG. 16). A retainer 242 in the form of a clip is receivable in the recess 234 and is generally defined by a flat plate 244 having an upper boss at 246 having a through aperture at 248 to receive a fastener at 250. Retainer 242 further includes a lower arcuate edge 252 as described in greater detail herein.

Figure 17:
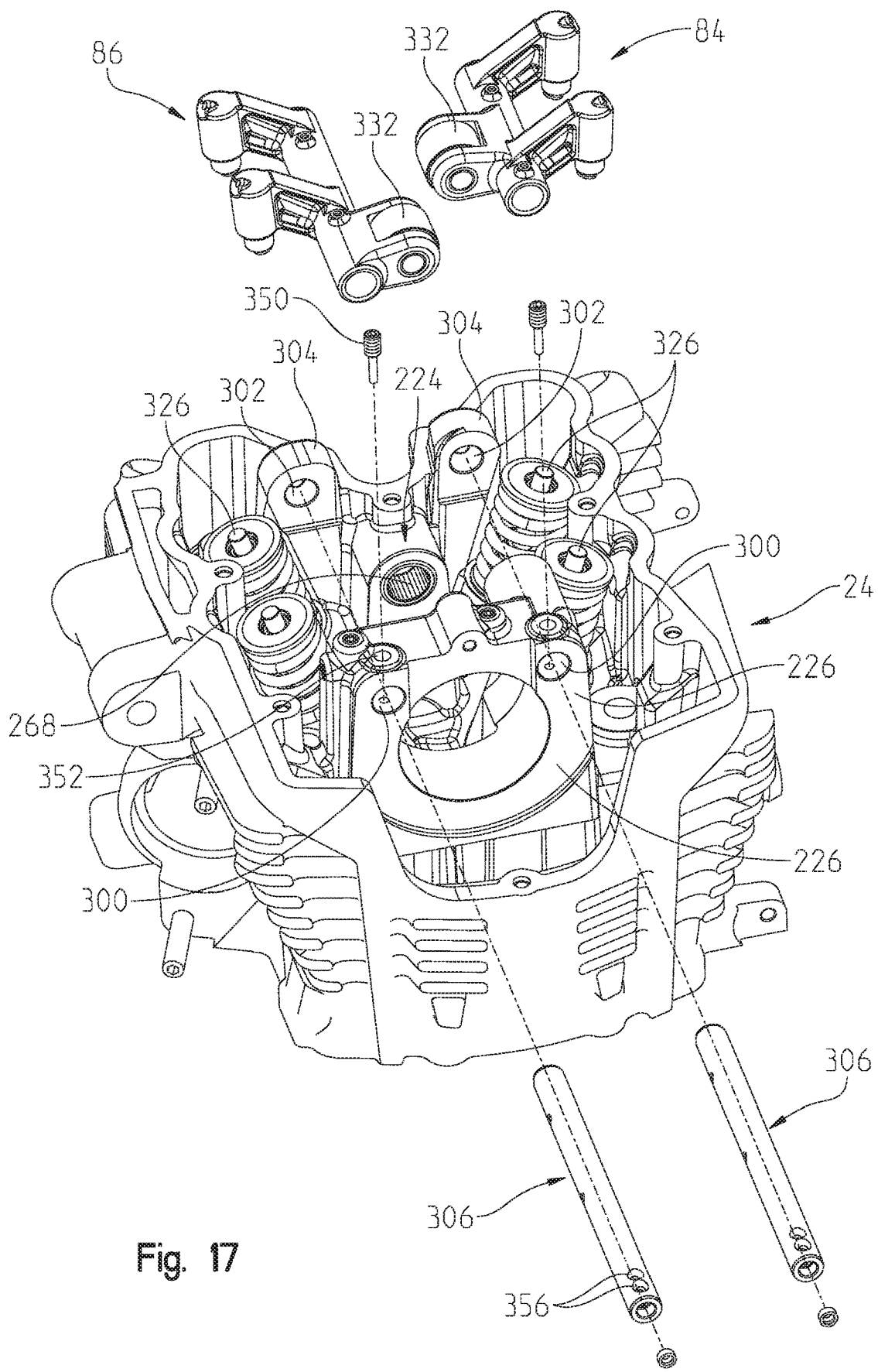
FIG. 17 shows the head assembly with the rocker arms removed.

With reference now to FIGS. 14 and 15 cam shaft 82 will be described in greater detail. As shown, cam shaft includes two bearing portions 260 and 262 at opposite ends thereof with cams 264 and 266 positioned therebetween. It should be appreciated that bearing portion 262 is receivable in aperture 240 to rotate therein with an associated bearing 268 (FIGS. 16 and 17). Cam shaft 82 further includes flange portions 270 on diametrical sides of the cam shaft which are profiled for receiving fasteners 272 (FIG. 14) in threaded apertures 274 (FIG. 15). Fasteners 272 retain a drive gear 278 to the cam shaft for driving the cam as is known in the art. As shown best in FIGS. 15 and 16, cam shaft 82 further includes a peripheral groove 280 where groove 280 is substantially adjacent to a front of recess 234 as best shown in FIG. 16. It should be appreciated that bearing portion 260 is profiled for rotation within the head with sufficient clearance between an outer diameter of bearing portion 260 and aperture 228. As best shown in FIG. 16, it is also apparent that bearing portion 260 has a larger outer diameter than either of cams 264 or 266 and that bearing portion 262 has a smaller diameter than either of cams 264 or 266.

Figure 18:
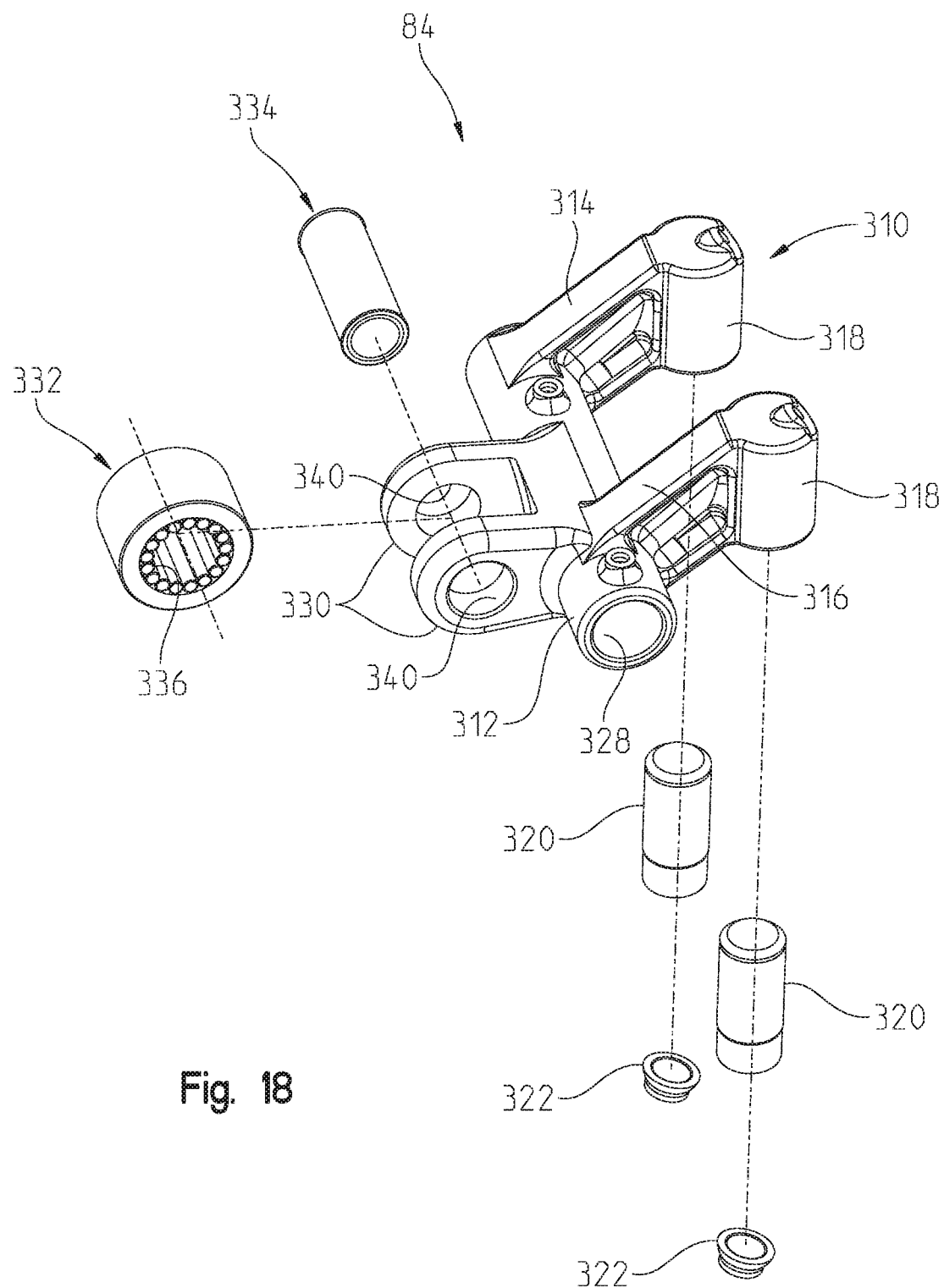
FIG. 18 shows an exploded view of one of the rocker arm assemblies.

Therefore, bearing portion 262 is receivable into bearing portion 268 and both cams 264 and 266 are receivable through aperture 228 to a position where bearing portion 260 is journaled in aperture 228 of wall 226. Retainer 242 may now be positioned in the recess 234 and slid downwardly such that circular edge 252 is received in the slot 280 (see FIG. 16) whereupon fastener 250 may be received to couple retainer 242 to the upstanding wall 226. Due to the receipt of the retainer 242 in slot 280, the cam shaft is held in an axial sense within the head but may be readily removed by removing fastener 250, and sliding retainer clip 242 upwardly out of the recess 234, removing the clip 242 from the slot 280. This allows the cam to move out of the head (to the left as viewed in FIG. 16) without having to remove the rocker arms 84, 86. With reference now to FIGS. 17 and 18, rocker arm assemblies 84 and 86 will be described in greater detail.

With reference first to FIG. 17, wall 226 further includes apertures at 300 which cooperate with apertures 302 in wall portions 304 to receive rocker arm shafts 306. With reference now to FIG. 18, rocker arm assembly 84 is shown in an exploded manner where rocker arm 310 is shown having a central shaft 312 having two rocker arms 314, 316 extending therefrom. Each of the arms 314 and 316 includes a cylindrical portion 318 at its end which opens downwardly to receive inserts 320. Valve caps 322 are receivable over valve stems 326 (FIG. 17) providing a bearing surface between the inserts 320 and the valve stems 326. As shown in FIG. 18, another pair of arms 330 extend from an opposite side as arms 314, 316 and receive therein cam follower 332 and a press fit pin 334. Cam follower 332 includes a bearing 336 such as a needle bearing which rides on pin 334 providing free rotation of the cam follower 332. Each of the arms 330 includes apertures 340 to receive pin 334. Rocker arms 310 are held in position within the head 24 by positioning inserts 322 over valve stems 326 and aligning aperture 328 with apertures 300 and 302. Shafts 306 may then be inserted through apertures 300 into aperture 328 and thereupon into aperture 302. Shafts 306 may be retained in place by way of a fastener 350 (FIG. 17) being insertable through aperture 352 at the top of wall 226 and receivable into one of the threaded apertures 356. This also positions cam followers 332 in an engaged position with one of the cams 264 or 266 (FIG. 15). Thus, upon rotation of cam shaft 82, the cam lobes of cams 264 and 266 contact cam follower 332 causing the rocker arm 310 to rotate about its associated shaft 306 causing arms 314 to rotate in the opposite sense as arms 330 whereby valves are activated through contact with the valve stems 326.

With reference now to FIG. 19A-22, decompression device 220 will be described in greater detail. With reference first to FIG. 19A, decompression device 220 is generally comprised of outer plate 380, inner plate 382, moveable plates 384A and 384B, and rotateable rod 386. It should be noted that the moveable plates 384A and 384B are identical and cooperate in an overlapping relationship such that the thickness of the combination is no greater than the thickness either plate 384A or 384B. And while they are identical, the moveable plates will be referred to as 384A and 384B only for the purpose of designating the stationary location as depicted in the figures.

Figure 20A:
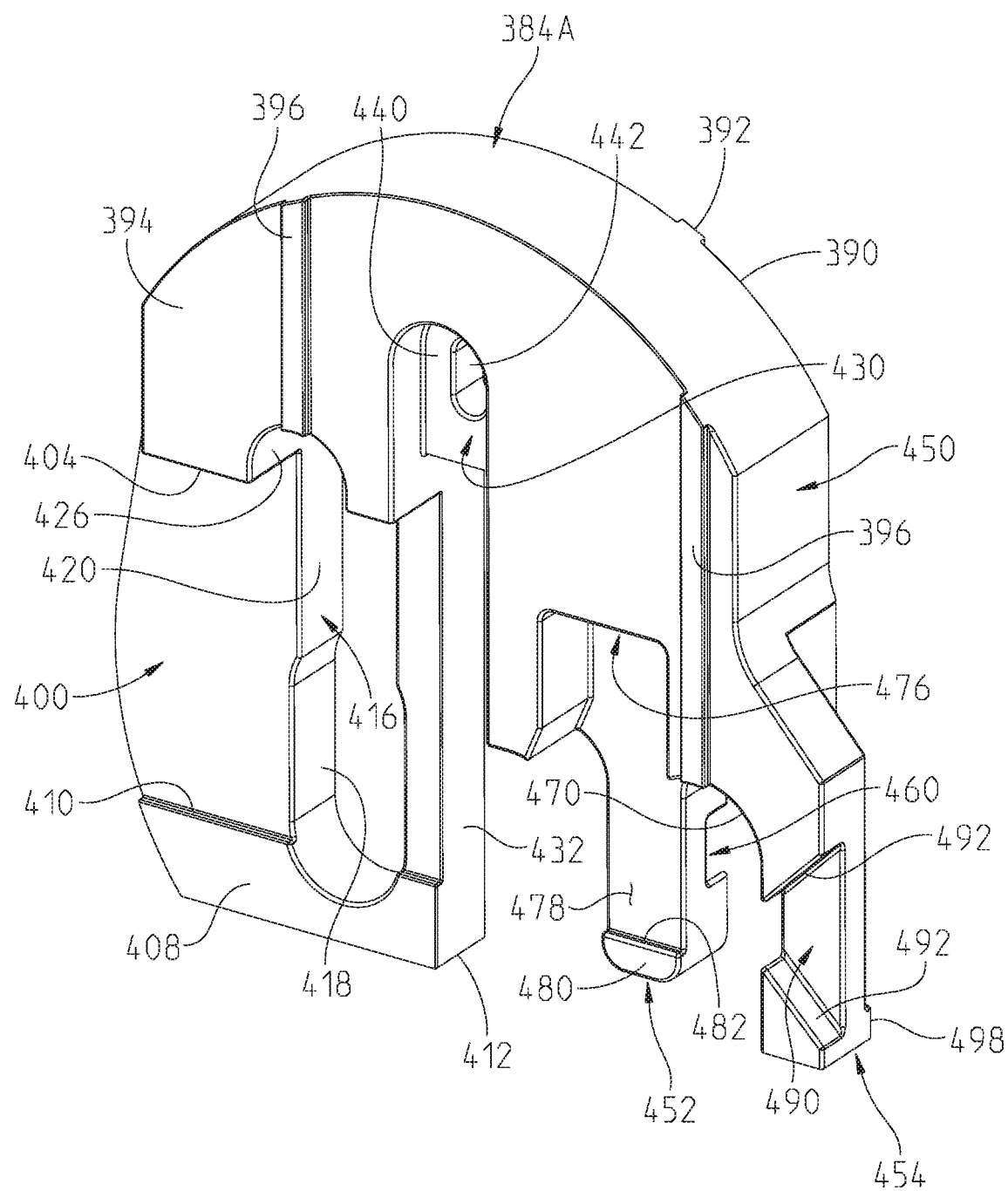
FIG. 20A shows an enlarged view of one of the moveable plates of the decompression device.
Figure 20B:
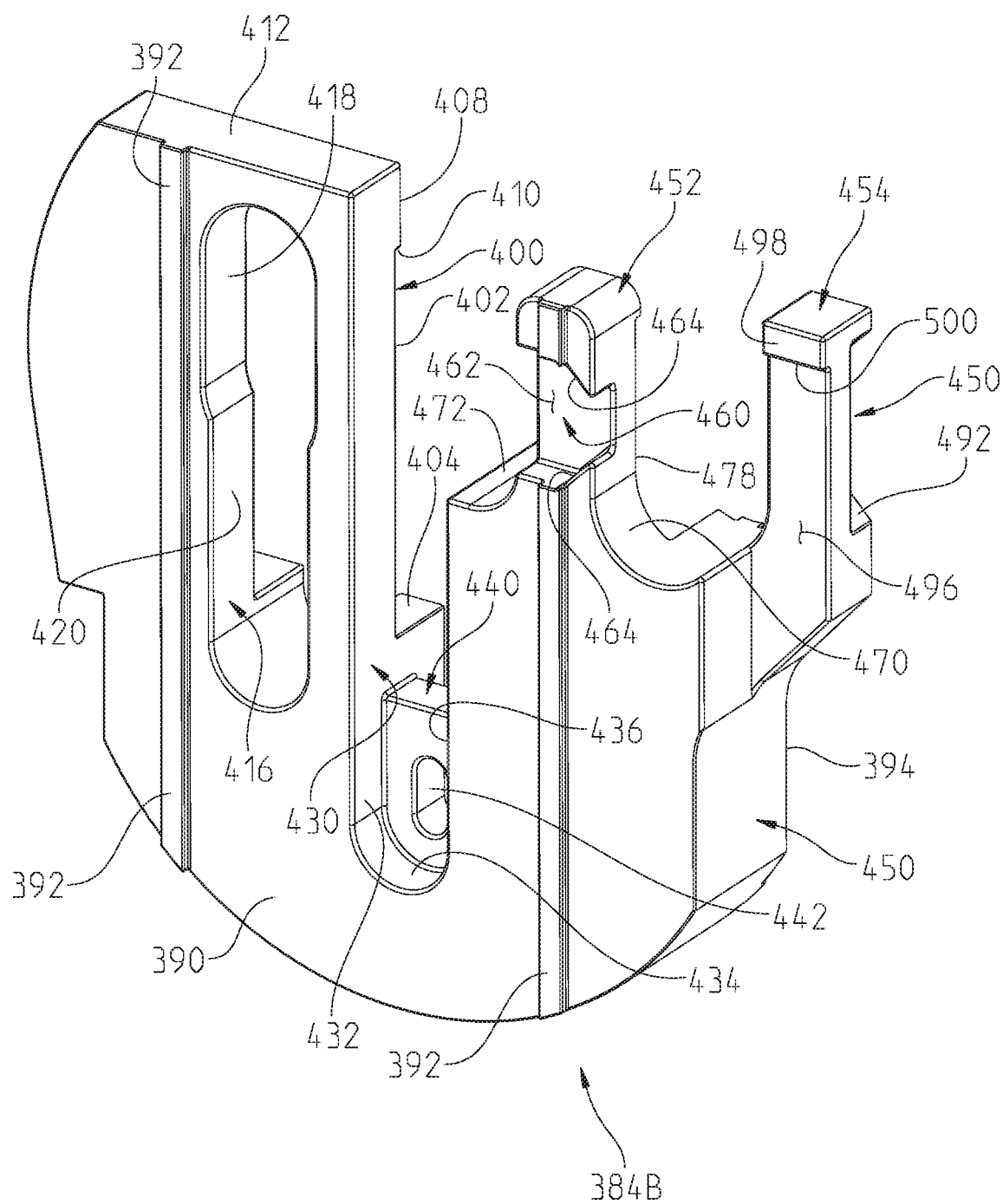
FIG. 20B shows an enlarged view of the other moveable plate of the decompression device.

With reference now to FIGS. 20, 20A and 20B, each moveable plate 384A, 384B includes a face 390 having ribs 392 extending vertically along the face 390. Each of the moveable plates 384A, 384B includes a face 394 having ribs 396 extending along the face in a substantially vertical orientation. Each of the moveable plates 384A, 384B further includes a wall portion 400 having a recessed surface at 402 thereby defining a shoulder at 404. Wall 400 further includes a surface at 408 protruding out slightly from surface 402 defining a shoulder 410. It should be appreciated that when in the position shown in FIG. 19A, surface 408 of each of the moveable plates 384A, 384B is positioned against the corresponding surface 402 and that surfaces 412, 404 are in an abutting relationship.

With reference to FIGS. 20A and 20B, wall 400 further includes an elongate slot 416 having an enlarged diameter portion 418 and a reduced diameter portion 420. As shown best in FIG. 20A, slot 416 extends into shoulder 404 defining a semi-cylindrical slot portion 426. It should be appreciated that when moveable plates 384A, 384B are positioned adjacent to each other as shown in the FIG. 19A position, that slot 426 is positioned above wall 412 of moveable plate 384B, and vice versa. Wall 400 defines a U-shaped slot 430 having an inner surface 432 (FIG. 20B), an arcuate surface 434 and a surface 436 opposite surface 432. U-shaped slot 430 is substantially centrally located relative to each of the moveable plates 384A, 384B such that the slots 430 align when positioned together. The end of the slot 430 includes a wall 440 having a slot at 442. Wall 440 is centrally located relative to surfaces 390 and 394 such that each of the walls 440 of each of the plates 384A and 384B are substantially one above the other when the plates are positioned in their operating position.

With reference still to FIGS. 20A and 20B, each of the moveable plates 384A and 384B further include a wall portion 450 including a first leg 452 and a second leg 454. Leg 452 is interrupted at an opening 460 defining an inner surface at 462 (FIG. 20B) and angled surfaces 464. Surfaces 464 angle towards each other and into a slot 470. Another slot 472 is positioned on an opposite side of arm 452 as described herein. As shown best in FIG. 20A, arm 452 extends only partially widthwise of the wall 450 defining a substantially rectangular opening at 476. Leg 452 further includes a surface at 478 with a protruding surface at 480 defining a shoulder at 482. Thus, it should be appreciated that when in the position shown in FIG. 19A, that corresponding legs 452 are positioned adjacent to each other where each leg 452 extends into the corresponding slot 476, and that surfaces 480 abut their corresponding surface 478.

Leg 454 is on the opposite side of leg 452 in a width-wise direction and defines an interruption at 490 having incline surfaces at 492 (FIG. 20A) which narrow inwardly towards slot 470. Leg 454 defines a surface at 496 (FIG. 20B) having a protruding surface 498 defining a shoulder at 500. It should be appreciated that when the moveable plates 384A, 384B are positioned in the configuration of FIG. 19A that one of the leg portions 454 is in front of and in an overlapping relationship with, the leg portion 454 of the corresponding moveable plate. This positions surfaces 498 in contact with surfaces 496 of each plate portion.

With reference again to FIGS. 20 and 21, the remaining portions of the decompression device will be described. Outer plate 380 includes a front face 520 and an inner face 522 having ribs 524 extending along face 522. Plate 380 further includes an aperture 526 and a second aperture at 528. Aperture 528 is counterbored at 530 as best shown in FIG. 21. With reference still to FIG. 21, plate 380 includes an upper semi-cylindrical post 534 and a lower semi-cylindrical post 536 as described herein.

Plate 382 includes an outer face 540 and an inner face at 542 having a plurality of ribs 544. Plate 540 includes an aperture 546 which aligns with aperture 526 of plate 380. Aperture 546 is counter sunk at 550 (FIG. 21) so as to receive a fastener 552 as described herein. Plate 382 further includes an aperture 560 which aligns with aperture 528 and as shown best in FIG. 20 is counterbored at 562. Plate 382 further includes an aperture at 570 and alignment pins at 572 (FIG. 21). Plate 382 further comprises an upper semi-cylindrical post 576 and a lower semi-cylindrical post 578.

The remaining portions of the decompression device 220 includes a sleeve 580, a tension spring 582, and the rotating rod 386. Tension spring 582 includes a coil spring portion 584 and upper and lower hooks 586. Rotating rod 386 includes an aperture at 590 to receive a pin 592 therethrough such that a portion of the pin 592 extends through both sides of the rotating rod 386. Rotating rod 386 further includes a flat portion 596 as further described herein. With the components of the decompression device described, the assembly will now be described.

With reference to FIG. 20, pin 592 is positioned in aperture 590 of rotating rod 386 and rotating rod 386 is thereafter positioned within the U-shaped slot 470 of moveable plate 384A. The pin 592 is positioned with a portion of the pin residing in portion 460 (FIG. 20B) of leg 452. The moveable plate 384B is then positioned adjacent to moveable plate 384A such that the other portion of the pin 592 resides within portion 490 (FIG. 20A) of moveable plate 384B. Tension spring 582 may be positioned within the slots 430 with the clips 586 positioned in corresponding apertures 442 of the moveable plate portions 384A and 384B. This spring loads the moveable plate portions 384A and 384B in the position of FIG. 19A. Sleeve 580 is then positioned within portions 418 of corresponding moveable plates 384A, 384B whereupon plates 380 and 382 may be installed. Plate 380 is positioned from the front side of the decompression device 220 with the counterbore 530 (FIG. 21) receiving a first end of the sleeve 580. This also positions semi-cylindrical post 534 within the semi-cylindrical recess 426 (FIG. 20A) of moveable plate 384A. Meanwhile semi-cylindrical post 536 is positioned in reduced diameter slot portion 420 (FIG. 20B).

In a like manner, rear plate 382 is positioned adjacent to the moveable plates 384A, 384B such that counterbore 562 (FIG. 20) receives the opposite end of sleeve 580. This also positions semi-cylindrical post 576 in the U-shaped slot portion 420 of moveable plate portion 384A and the semi-cylindrical post 578 in the semi-cylindrical recess 426 of moveable plate portion 384B. Fastener 552 may now be received into aperture 546 (FIG. 21) where fastener 552 includes a head portion 600 which is received in counterbore 550. Fastener 552 further includes a shank portion 602 (FIG. 21) which is receivable through apertures 546 and 526 whereupon a portion of shank 602 protrudes beyond face 520 of plate 380. Fastener 552 further includes a groove 610 which receives a circlip 612 to retain the device together.

It should also be appreciated that as assembled, the portion of the rotating rod 386 having the flat section 596 protrudes through aperture 570 as shown in either of FIG. 19A or 19B. The assembled decompression device 220 is shown in cross-section in FIG. 22 where the section is taken through the sleeve 580 and the fastener 552. This shows the overlapping nature of some of the components. For example, wall portion 400 of plate 384A is shown laterally aligned with leg 454 of plate portion 384B and likewise leg portion 454 of plate portion 384A is laterally aligned with wall portion 400 of plate portion 384B. Also, pin 592 is shown with a portion within the rotating rod 386 and a portion extending into leg portion 452 of moveable plate 384B. This also shows how pin 592 is aligned with the angled surfaces 492 of the moveable plate 384A. Sleeve 580 is also shown positioned intermediate the front and rear plates 380, 382 providing clearance between the plates 384A and 384B. The ribs are also shown positioned in an interdigitated fashion minimizing the friction between all of the plates 380, 382, 384A, and 384B.

Figure 22:
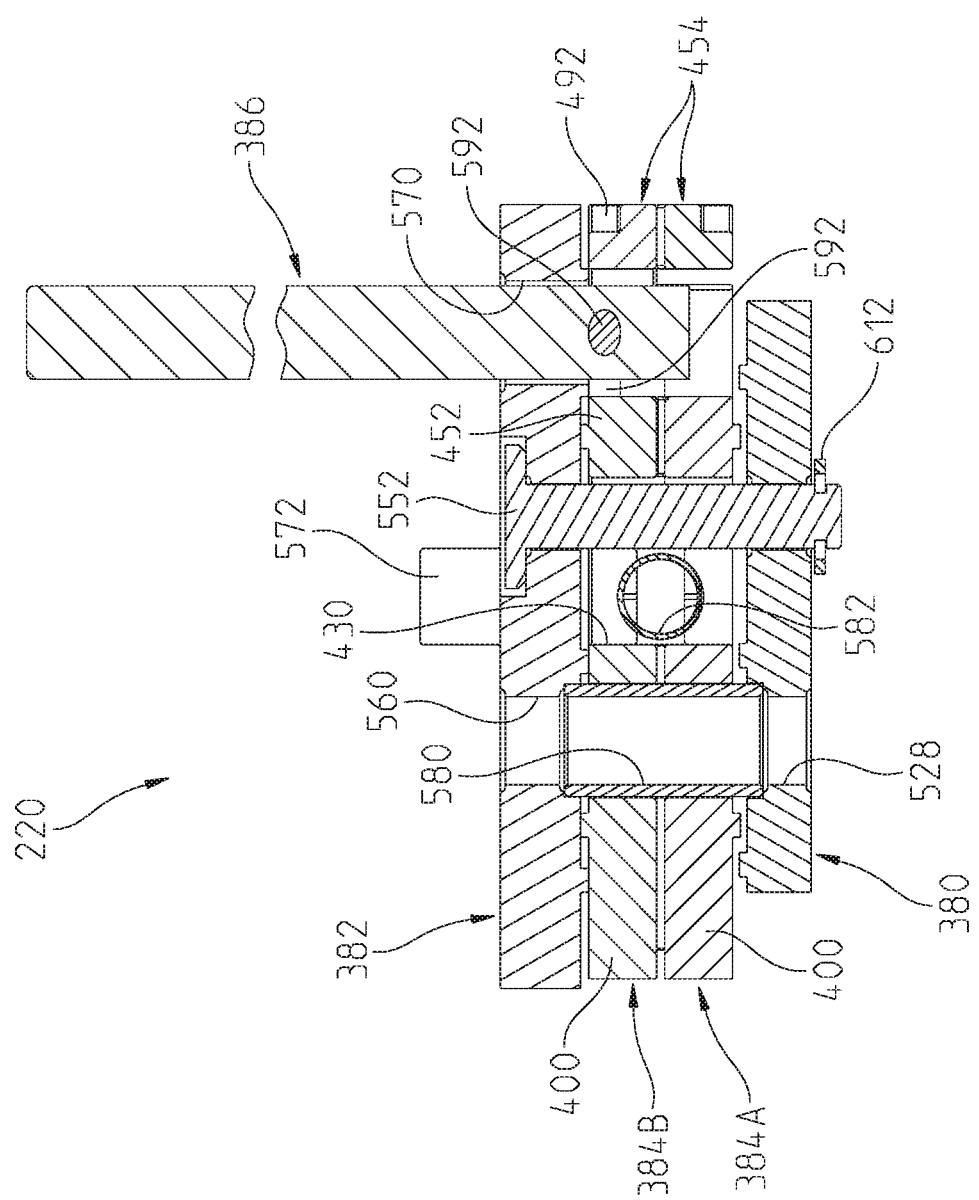
FIG. 22 is a cross-sectional view through lines 22-22 of FIG. 19A.

With reference again to FIGS. 14 and 15, the assembly of the decompression device 220 to the cam 82 will be described. As shown in FIG. 14, the end of flange portion 270 includes apertures 650 which align with posts 572 (FIG. 15) and an aperture 652 aligns with aperture 528 through decompression device 220. An aperture 656 extends through flange portion 270 to receive rotating rod 386. As shown in FIG. 15, aperture 656 extends through portion 260 of camshaft 82 and partially into cam 64 defining a slot at 658. Thus, when decompression device 220 is positioned against an end of flange portion 270, rotating rod 386 protrudes through aperture 656 with the flat portion 596 extending into the slot 658. A fastener 660 may be received through aperture 528 and into threaded aperture 652 to retain the decompression device 220 to the cam 82. It should be appreciated that fastener 660 also extends through sleeve 580 and aperture 560 (FIG. 22).

Figure 23:
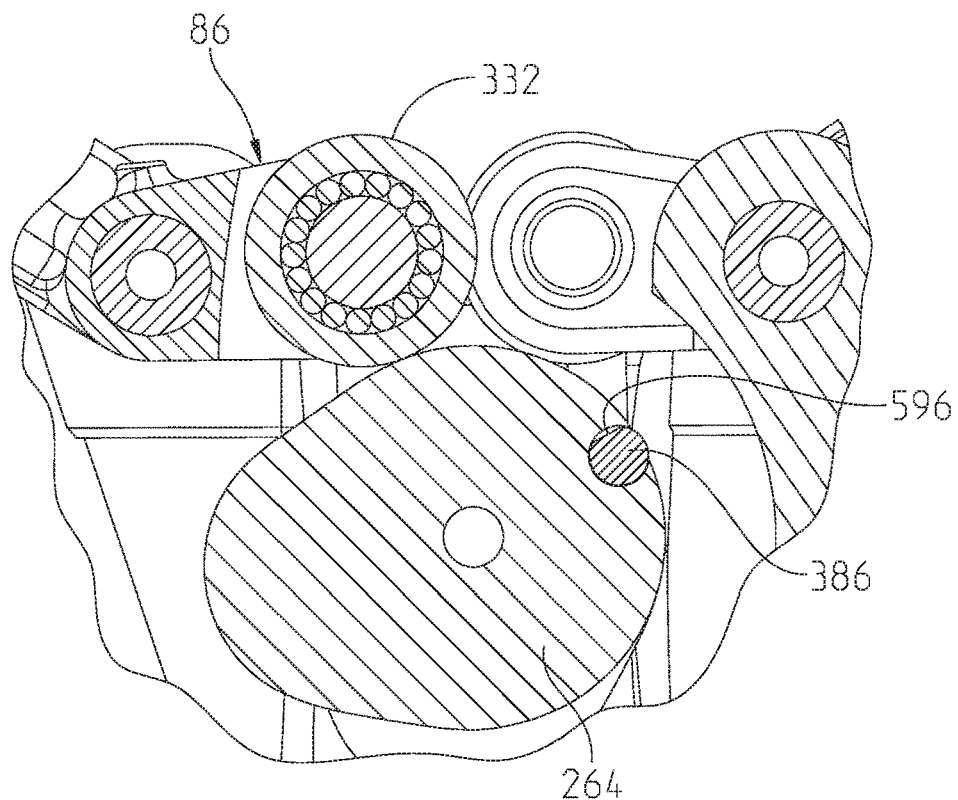
FIG. 23 is a cross-sectional view through lines 23-23 of FIG. 13 with the cylinder decompression device in the activated state.
Figure 24:
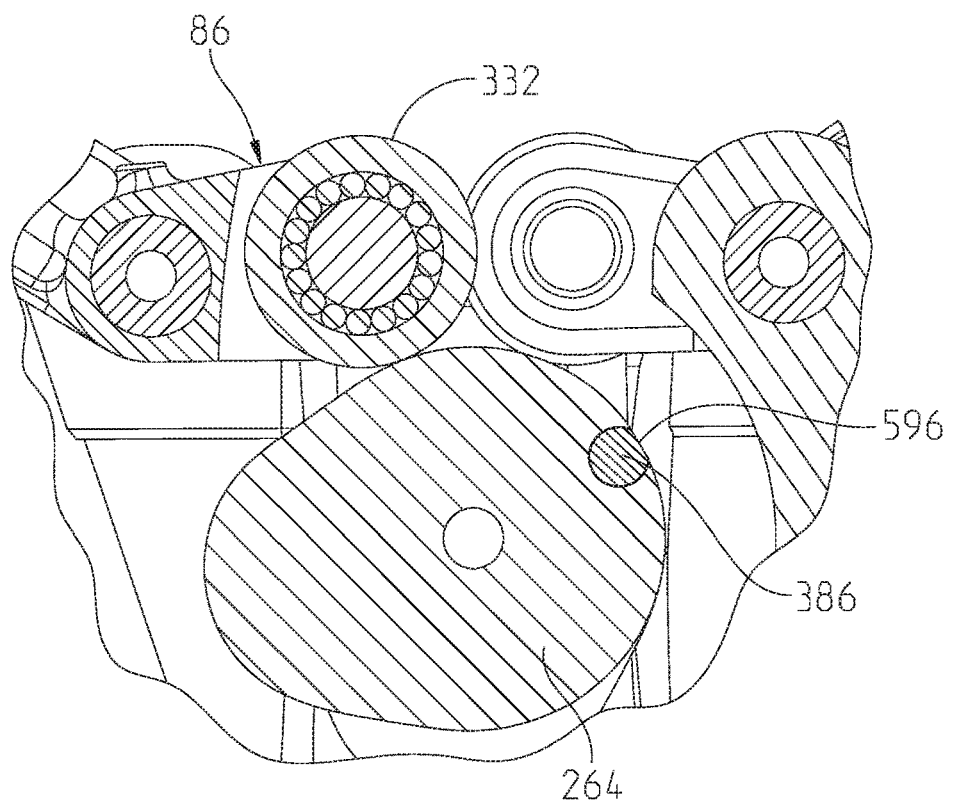
FIG. 24 is a cross-sectional view similar to that of FIG. 23 with the cylinder decompression device in the de-activated state.

With reference now to FIGS. 19A, 19B, 23 and 24, the operation of the decompression device will now be described. In the configuration of 19A, the moveable plates 384A and 384B are spring loaded together by way of tension spring 582 (FIG. 21). This would represent low operating RPM, such as during start. As shown in FIG. 19A, the flattened portion 596 is shown in an upward position which corresponds to the cross-sectional view of FIG. 23. As shown in FIG. 23, the flattened portion 596 is within the cam 264 such that a protrusion is defined between the rotating rod 386 and an outer surface of the exhaust cam 264. Thus, during a start, the protrusion of the rotating rod 386 will contact the exhaust rocker arm 86 and more particularly cam follower 332 slightly lifting the rocker arm 86 and opening the exhaust valve associated therewith. This decompresses the cylinder slightly for starting.

However, when the engine has begun to operate and increases in RPM the moveable plates 384A and 384B are forced outwardly overcoming the spring tension of spring 582, and due to the centrifugal force, move to the position of FIG. 19B. In this position, the portion 460 of moveable plate 384A (FIG. 20A) causes a rotation of the pin, and therefore causes a rotation of the rotating rod 386 from the position shown in FIG. 19A to the position shown in FIG. 19B. The position shown in 19B corresponds to the position of the rotating rod 386 in FIG. 24 where the flattened portion 596 substantially matches the contour of the outer surface of cam 264 preventing any lifting of the exhaust rocker arm 86. Thus, in this position, no decompression occurs.

Figure 11:
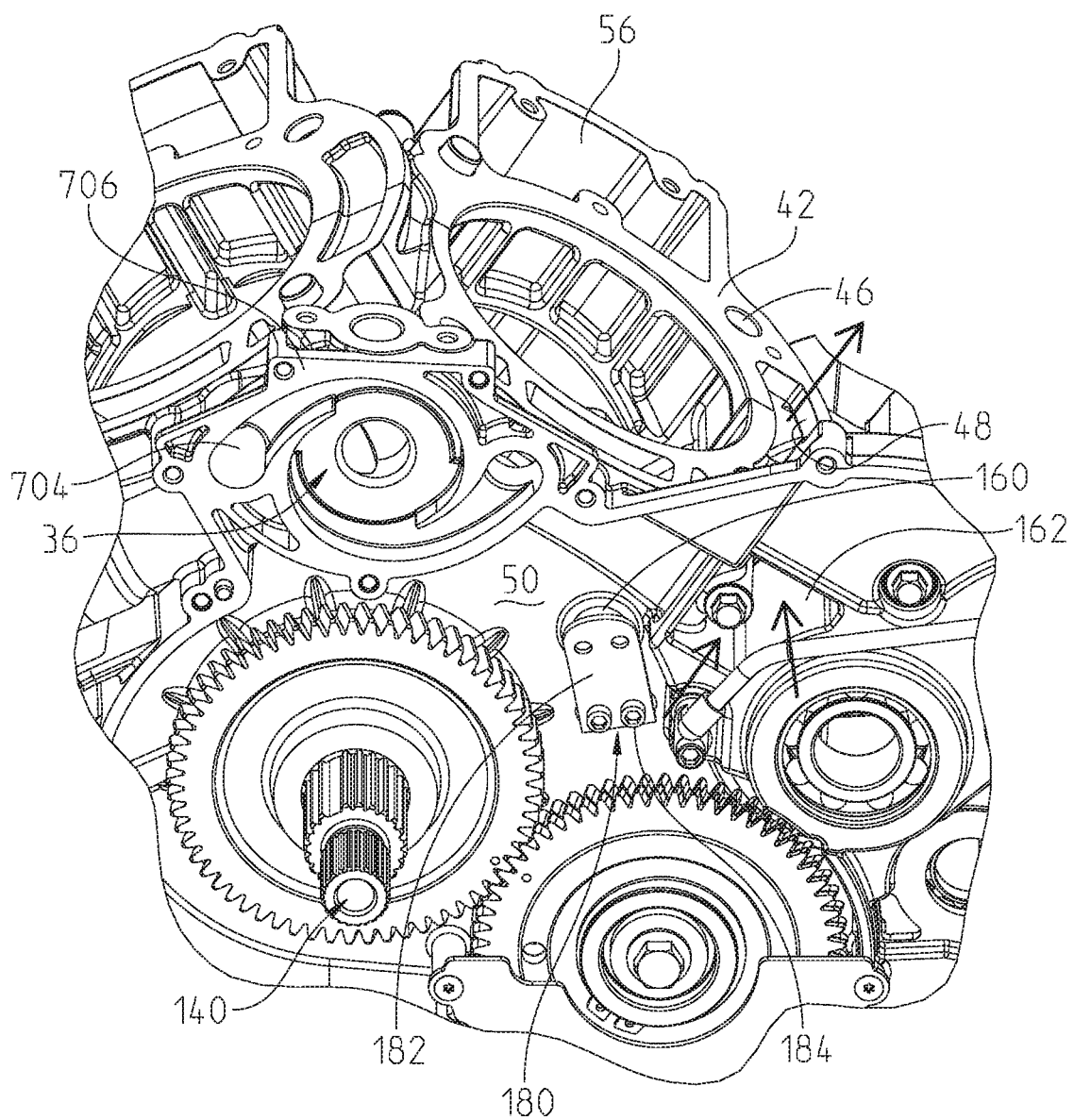
FIG. 11 shows a partial perspective view of a left hand side of the cylinder block.
Figure 25:
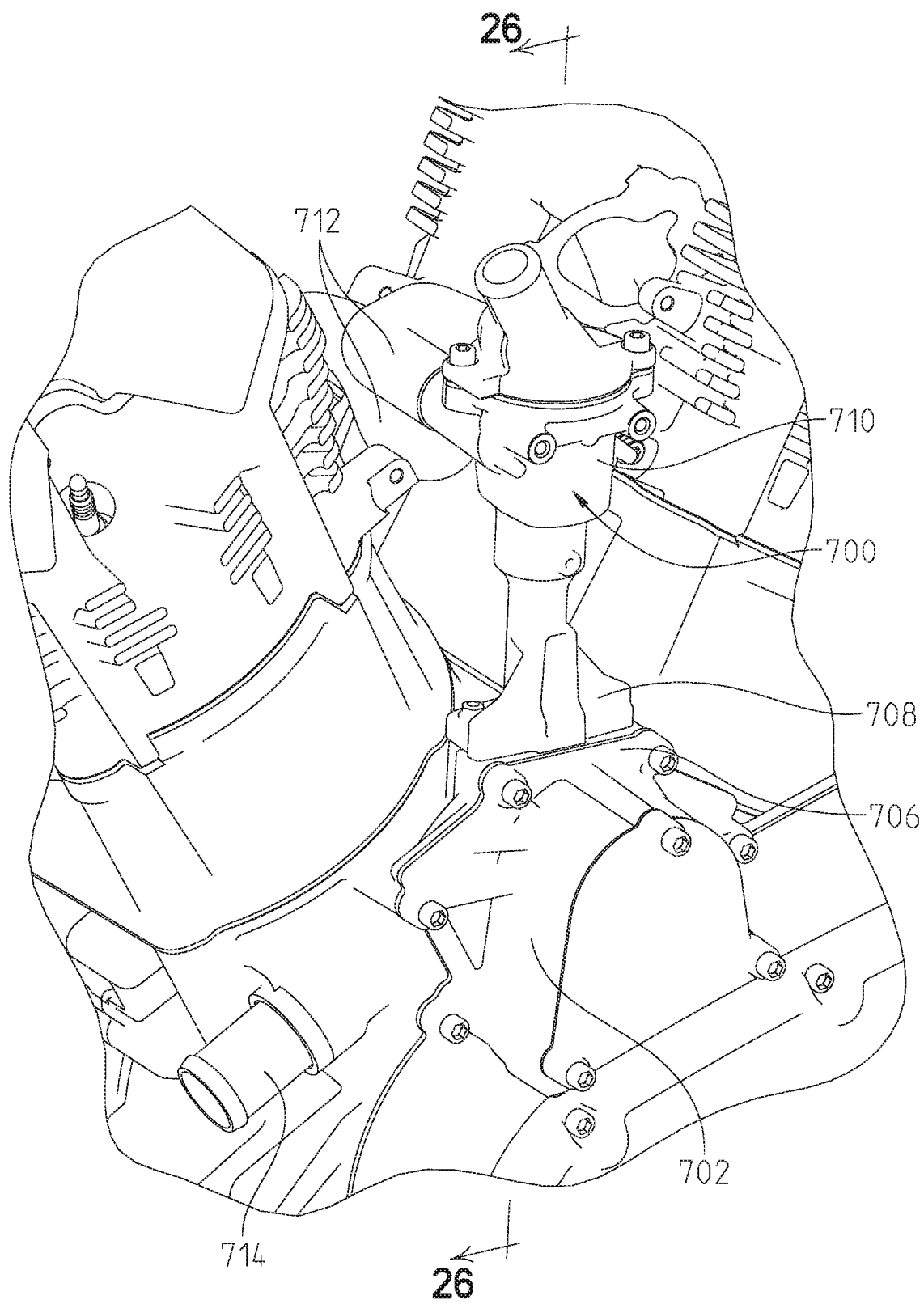
FIG. 25 is a perspective view of the engine water cooling system.
Figure 26:
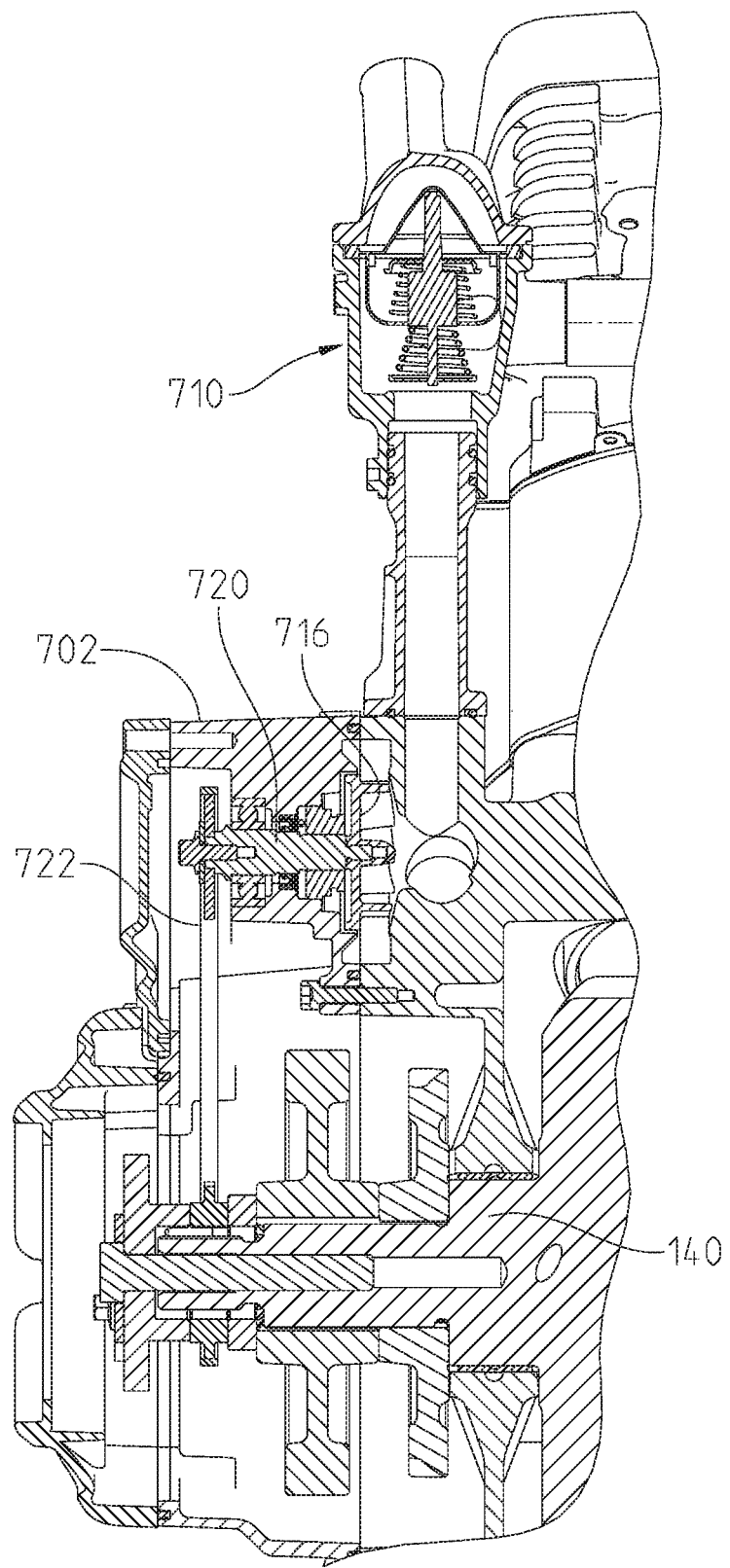
FIG. 26 is a cross-sectional view through lines 26-26 of FIG. 25.

With reference now to FIGS. 11, 25, and 26, the engine water cooling system will be described in greater detail. With reference first to FIG. 25, the water cooling system is shown at 700 which includes a water pump cover 702 which covers the integral water pump housing 36 (FIG. 11) defining internal convolutes 704 directing water through an upper flange 706 to a water coupling 708 upward to thermostat 710 and through tubing 712 to the engine. Water intake is shown at 714. An impeller 716 is positioned within water pump housing 36 and is driven by a shaft 720 driven by belt or chain 722 from the crankshaft 140. The cooling system as described herein is similar to that shown in U.S. patent application Ser. No. 14/214,033 filed Mar. 14, 2014, the subject matter of which is incorporated herein by reference.

Figure 27:
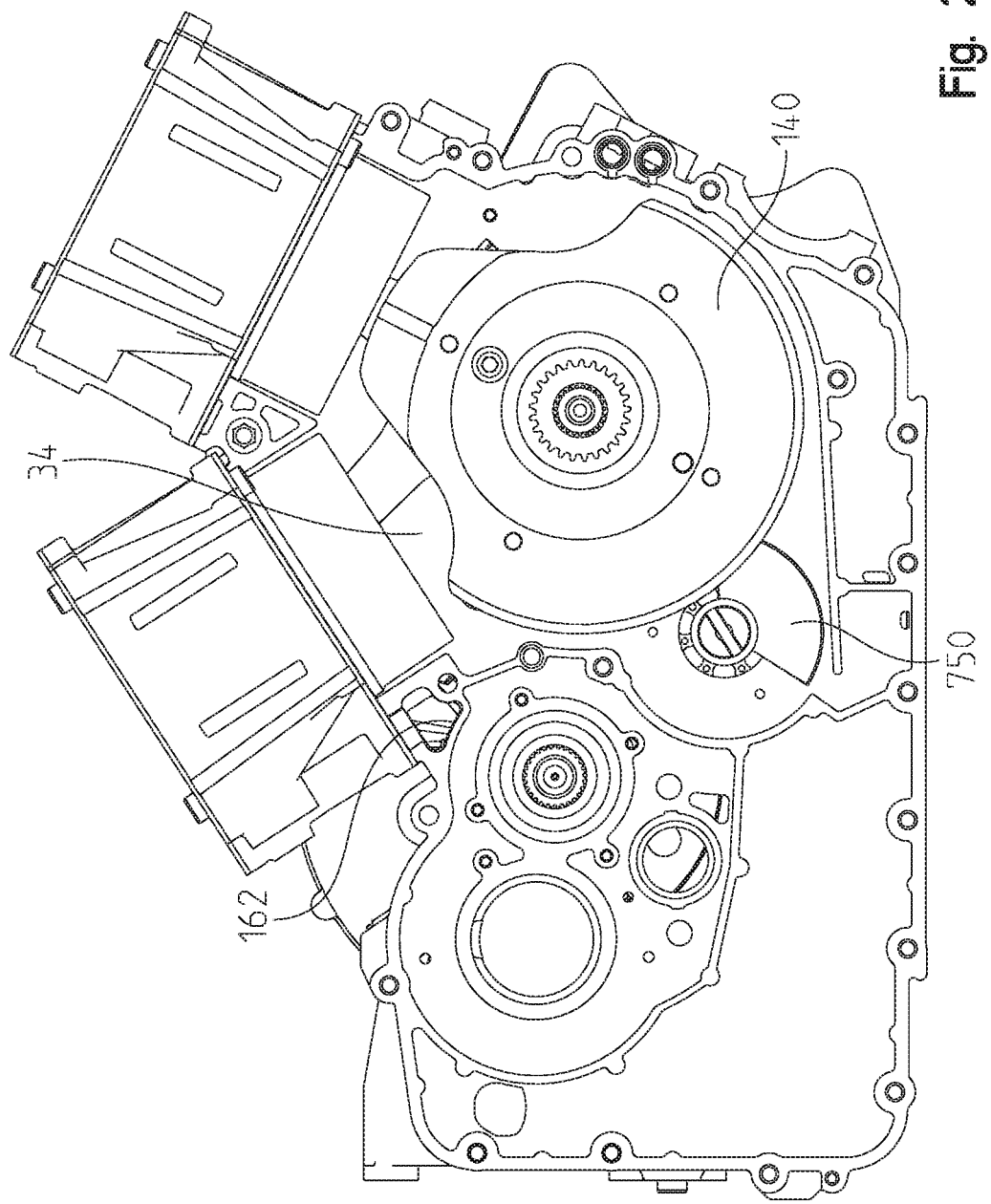
FIG. 27 shows the location of the balancing shaft.

As shown best in FIG. 27, the balancing shaft 750 is located rearward of the center line of the crankshaft 140 and under the rear cylinder.

Figure 28:
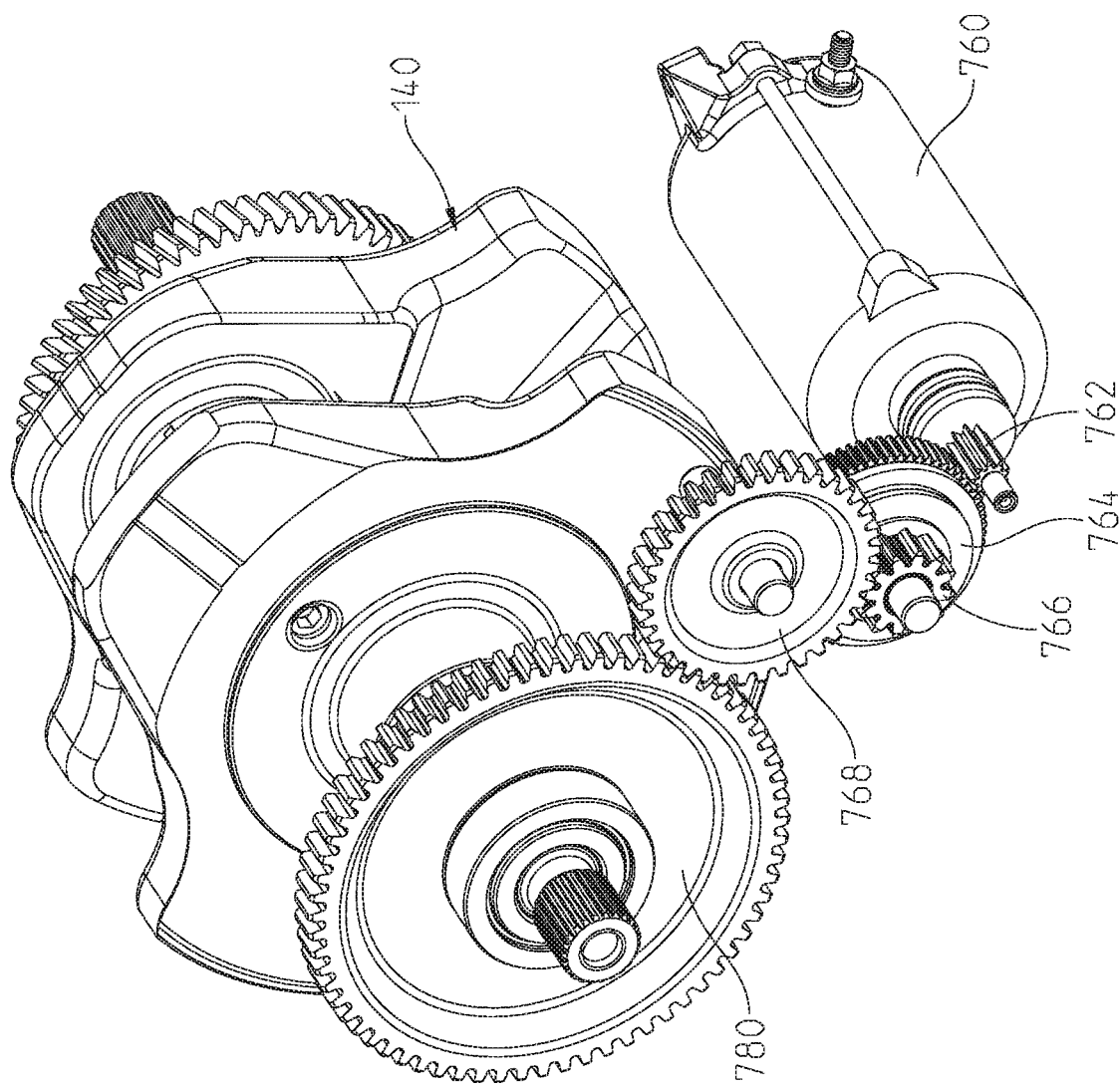
FIG. 28 shows starter motor drive.

With reference now to FIGS. 1, 3, and 28, the starter 760 is shown coupled to crankcase portion 20B. A pinion 762 is driven by the starter 760 which in turn drives a larger diameter gear 764 which in turn drives a pinion 766. Pinion 766 drives an enlarged gear 768 driving gear 780 coupled to the crankshaft 140.

Figure 29:
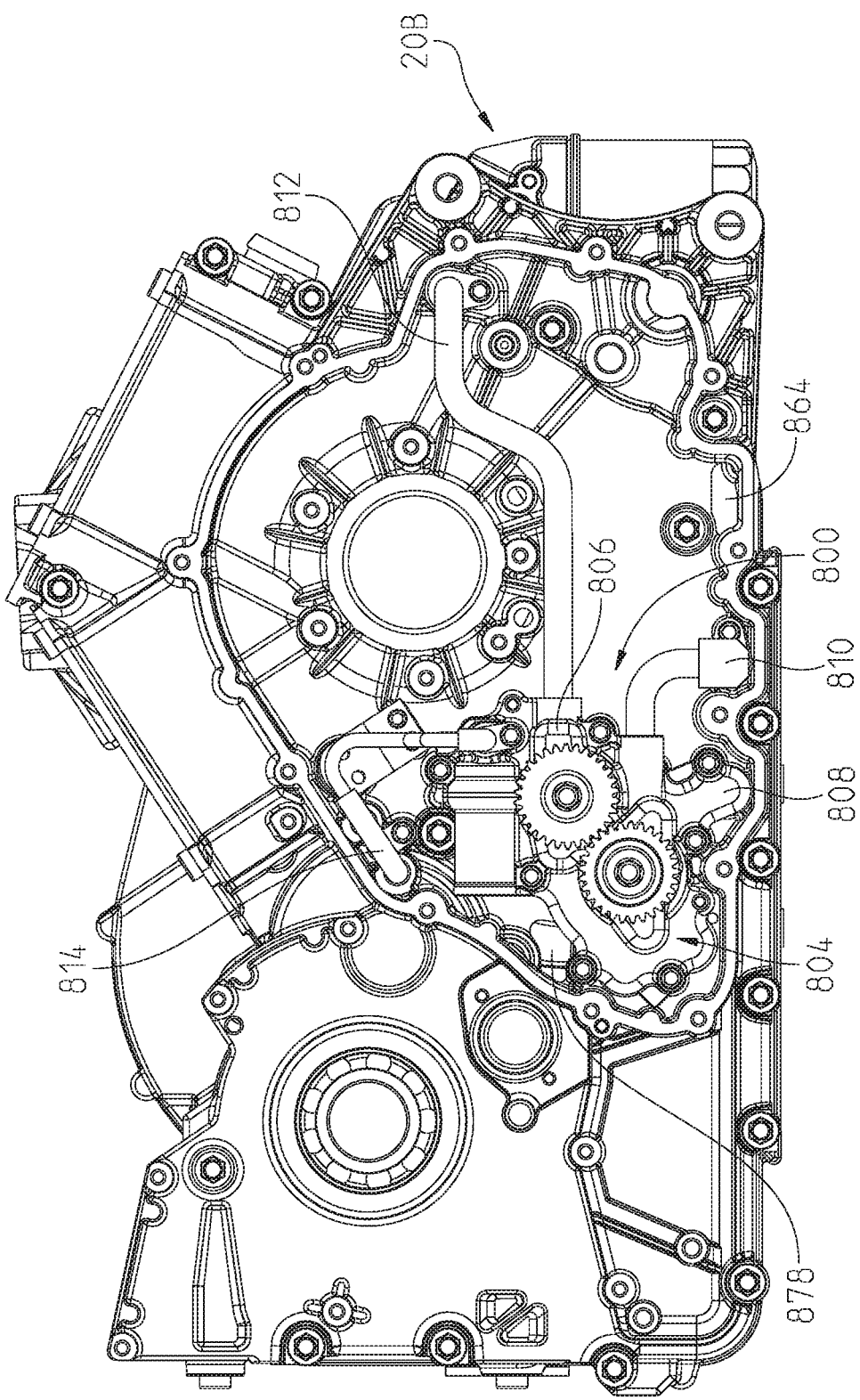
FIG. 29 is a right side view of the engine crankcase with the cover removed.
Figure 30:
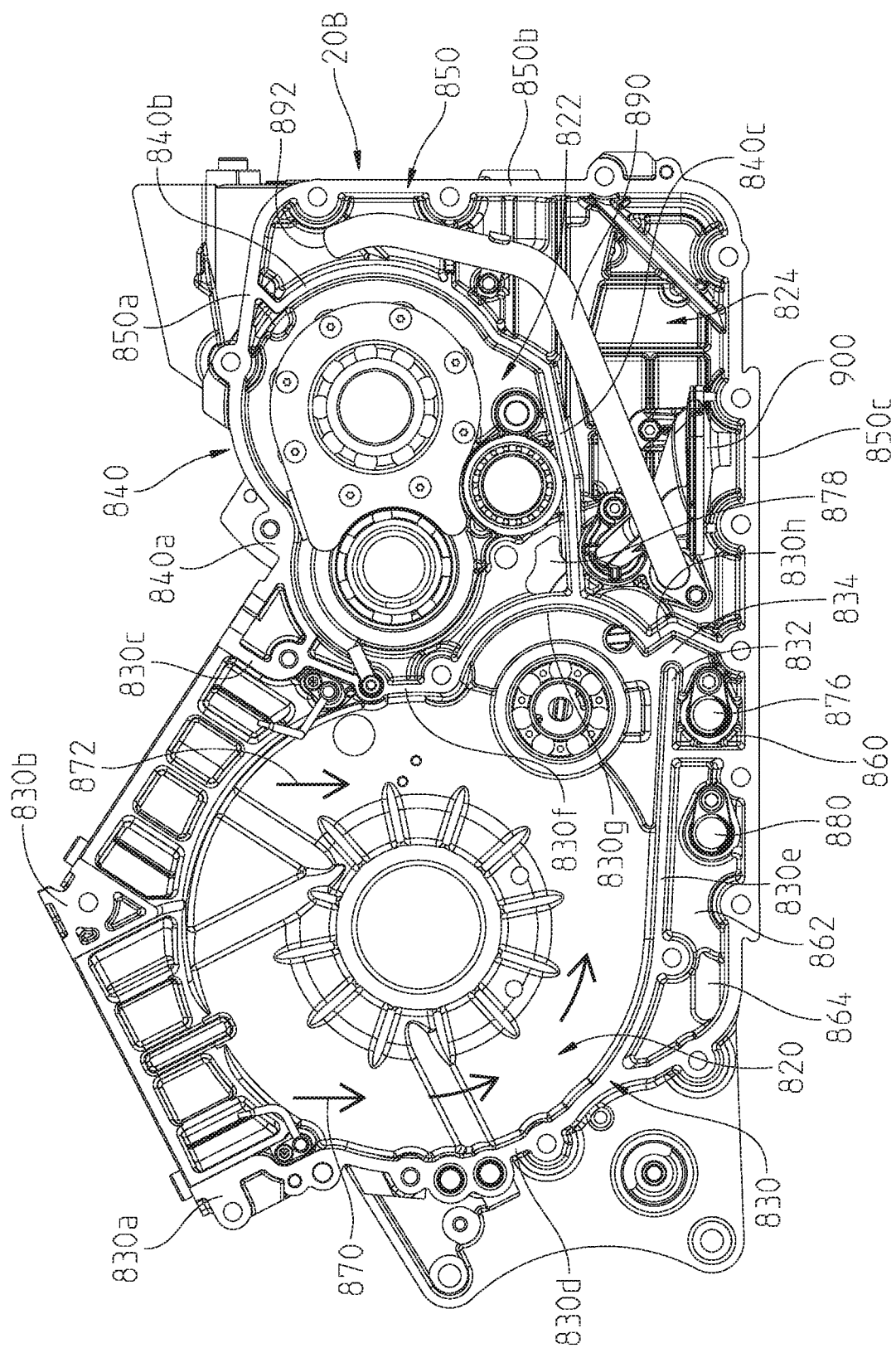
FIG. 30 is an inside view of the crankcase half viewed in FIG. 29 showing the internal compartments.
Figure 31A:
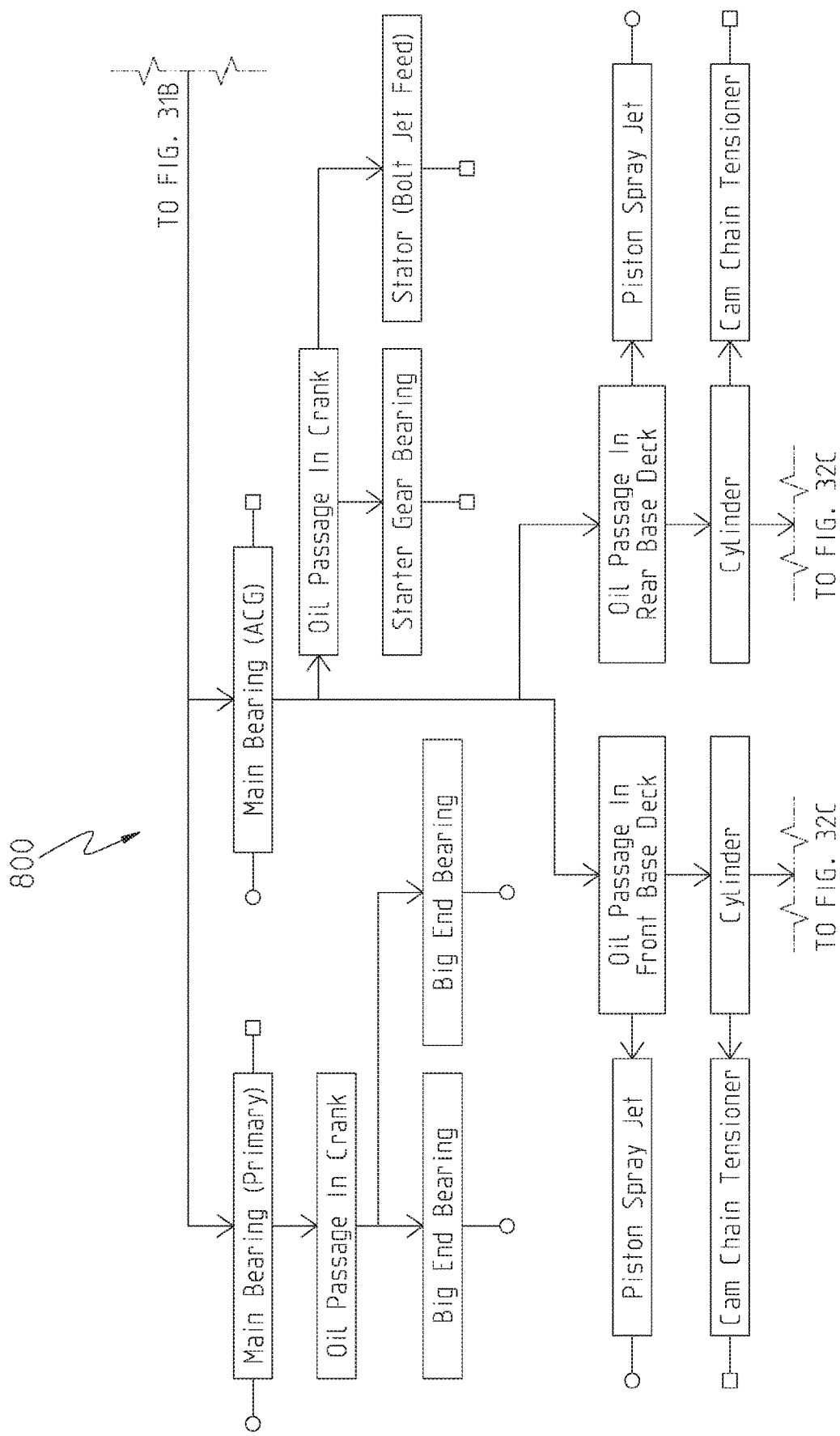
FIGS. 31A-31D are an engine lubrication schematic of the present disclosure.
Figure 31B:
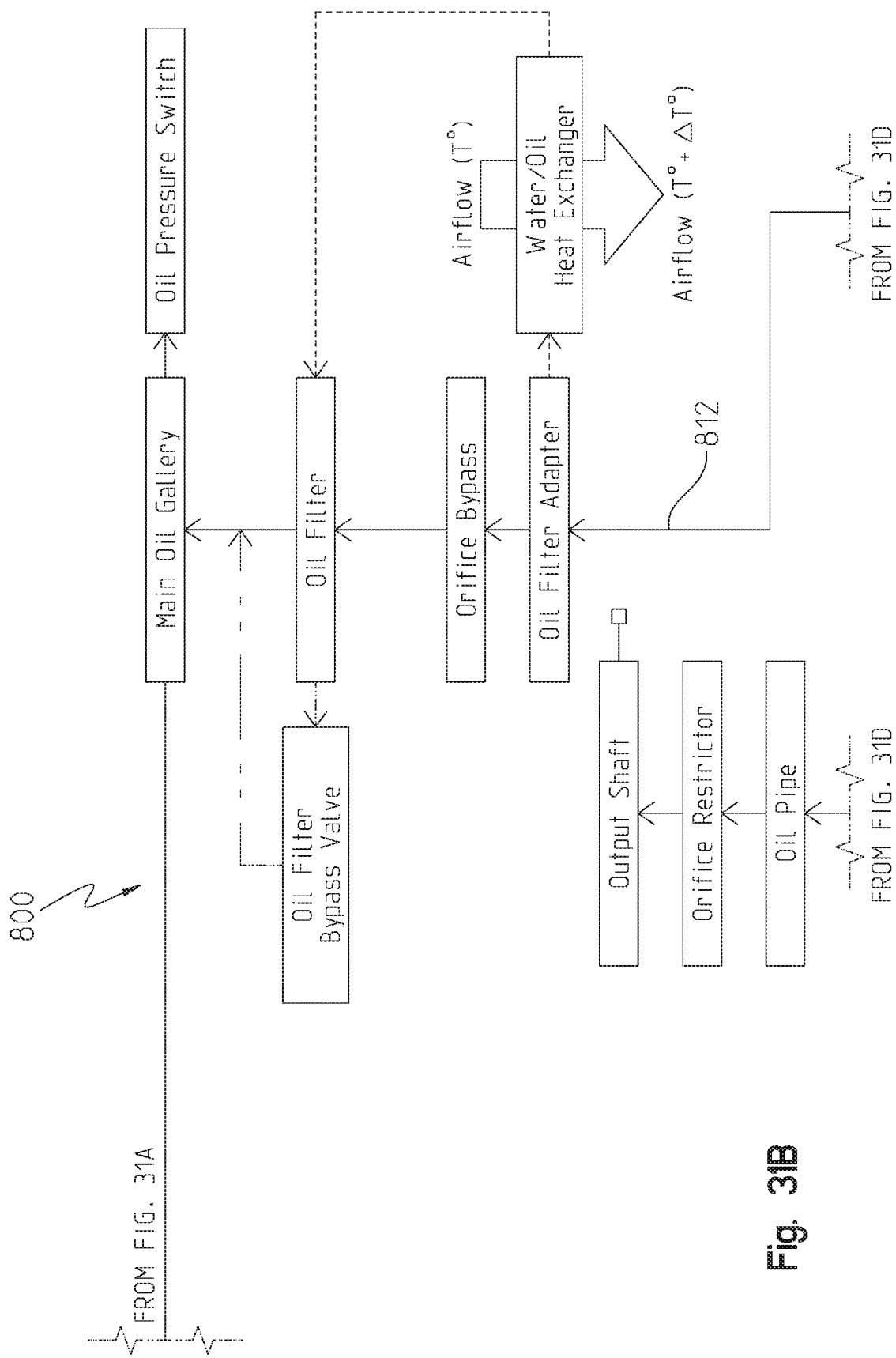
Figure 31C:
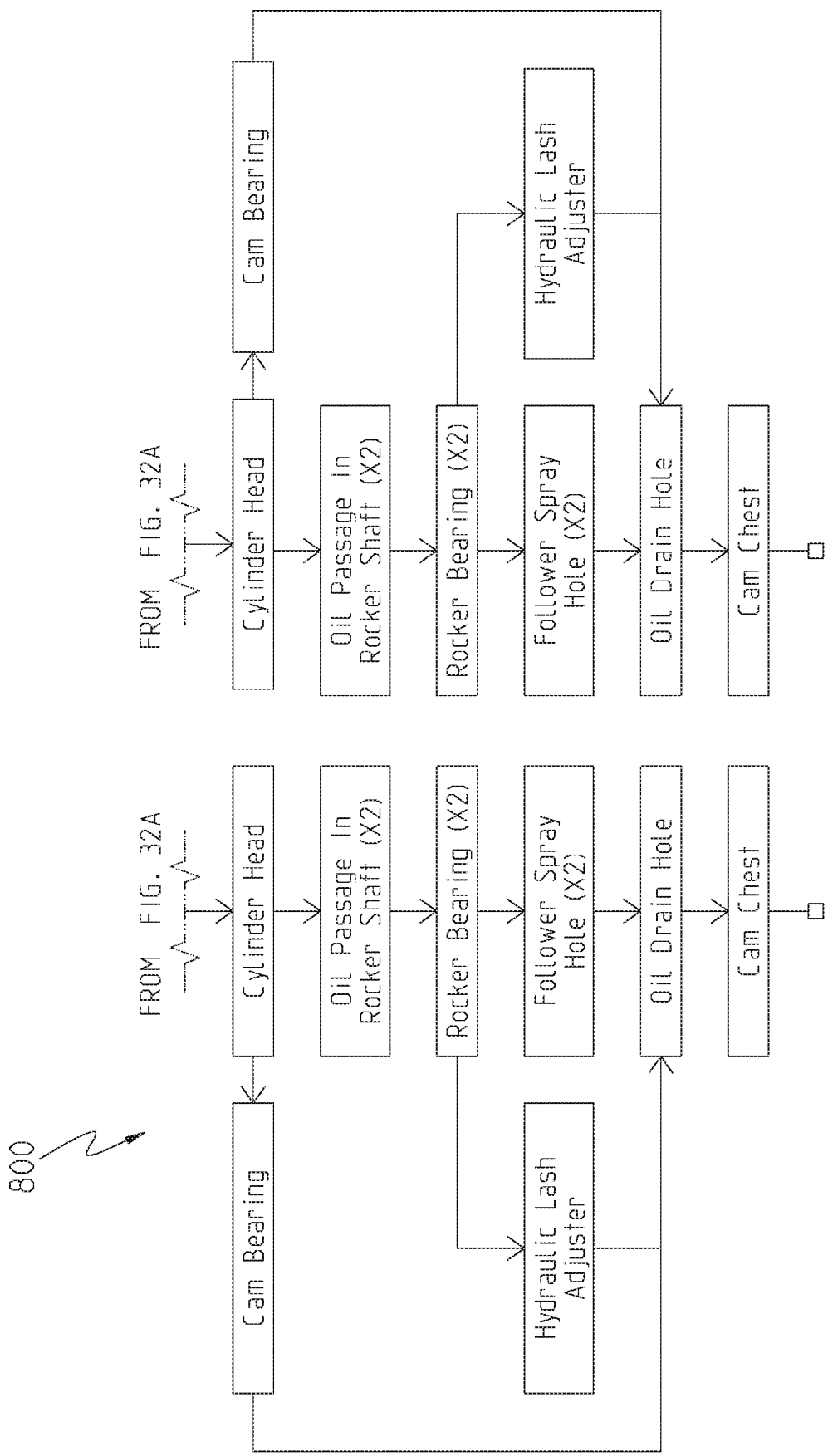
Figure 31D:
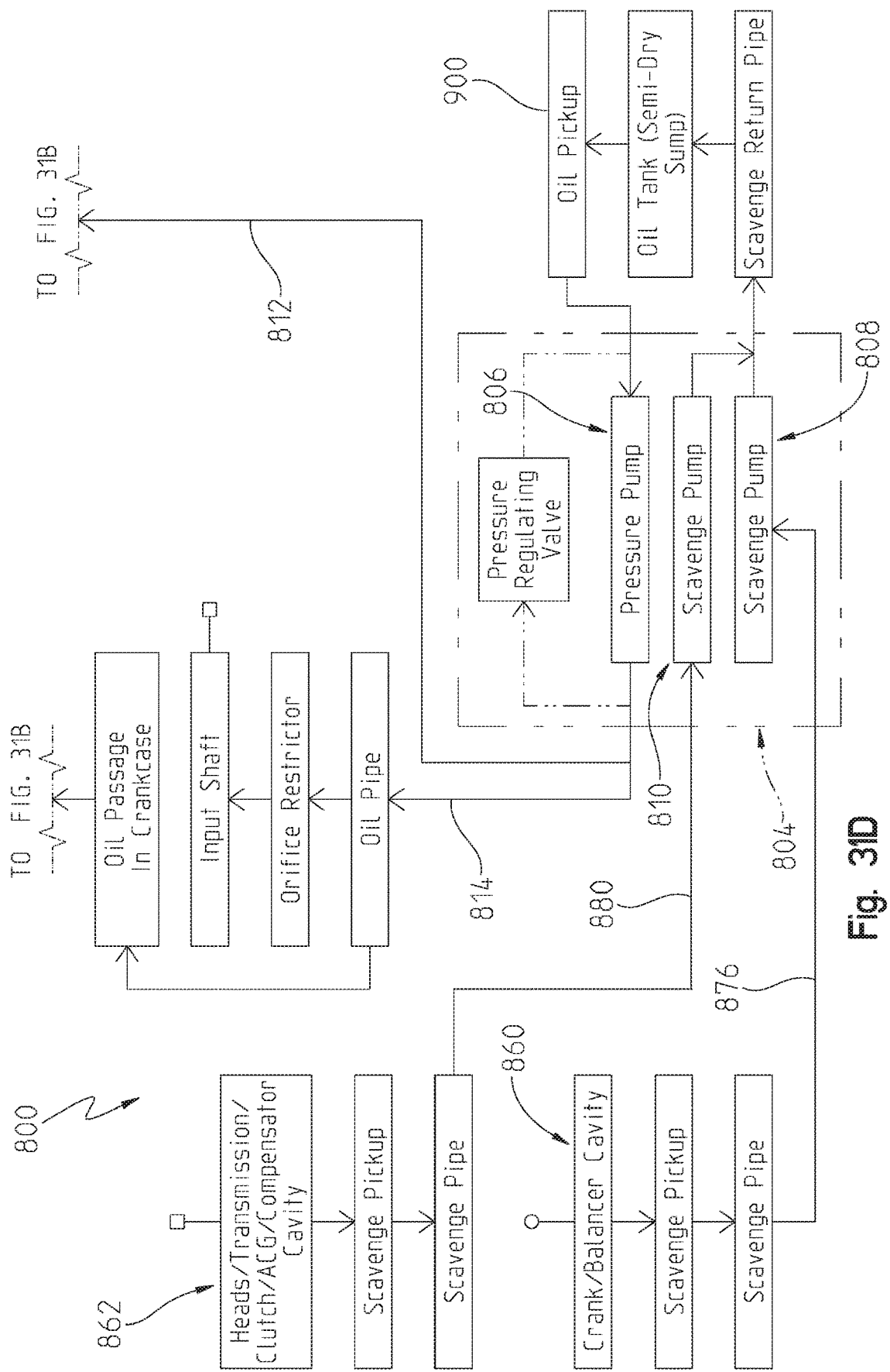

With reference now to FIGS. 29-31, the lubrication system of the present disclosure will be described. In general, the oil lubrication system for the engine and transmission includes a three stage pump where a first stage is a pressure pump feeding lubrication to at least some of the engine and transmission components, a second stage is a first scavenge pump for retrieving oil from the engine components and a third stage is a second scavenge pump for retrieving oil from the transmission components. In the embodiment shown, the oil lubrication system is a dry sump configuration.

With reference first to FIG. 29, the lubrication system is shown generally at 800. The lubrication system 800 is located on the outside of crankcase half 20B, but under cover 802 (see FIGS. 3 and 4). The lubrication system 800 includes a three stage pump 804 having a first stage 806 which is a pressure stage and provides for the oil to be delivered to the engine and transmission. A second stage 808 is a first scavenge pump which collects the oil drained from some of the engine and/or transmission components and returns the oil, as described further herein. A third stage 810 is a second scavenge pump which collects the oil drained from some of the engine and/or transmission components and returns the oil, as described further herein. The pump first stage includes oil lines 812 and 814 which delivers the oil to main arteries though the engine and transmission for lubrication purposes, as further described herein.

With reference now to FIG. 30, the right-hand side crankcase half 20B is shown, where three separate compartments are defined by the internal construction of crankcase halves 20A and 20B. It should be appreciated that FIG. 30 shows the internal construction of the crankcase half 20B, but that the internal construction of crankcase half 20A, while not shown, would be the mirror image as described below.

As shown, the first compartment is shown at 820 housing components of the engine, for example the crankshaft would be housed in compartment 820, as well as a portion of the piston connecting rods. Compartment 820 is defined by a wall defined in the crankcase half 20B at 830, where wall 830 includes an upper wall portion 830a which defines the opening for one of the engine cylinders, a wall portion 830b which defines the separation between the cylinders, and a portion 830c which defines the opening for the other cylinder. Wall portion 830a extends downwardly to define an arcuate wall portion 830d which circumscribes the crankshaft and leads into a straight wall portion 830e. Wall portion 830c extends downwardly to define wall portion 830f, which then leads into wall portion 830g which circumscribes the balance shaft. Wall portion 830h extends towards a free end 832 of wall portion 830e, which defines an opening 834. Second compartment 822 is partially defined by wall 840 having wall portions 840a, 840b and 840c. Compartment 822 is closed off by wall portions 830f, 830g; as well as wall portions 840b and 840c. Third compartment 824 is partially defined by wall 850 having wall portions 850a, 850b and 850c. Compartment 824 is closed off by wall portions 830g and 830h.

In addition to the three compartments 820, 822 and 824, crankcase halves 20A and 20B define scavenge cavities to receive the oil as it drains downwardly. More particularly, a first cavity 860 is defined which receives oil through opening 834 and a second cavity 862 which receives drained oil though opening 864.

More particularly, the operation of the lubrication system 800 will be described in greater detail. As mentioned above, the first stage of pump 804 delivers oil to the various components of the engine and transmission. As known, the oil is used for lubrication, but most of the oil drains downwardly and is then recycled again through the pump to return the oil to the engine and transmission components. As shown in FIG. 30, oil drains from engine components such as the pistons and crankshaft as shown at arrows 870 and 872, and then drains downwardly though opening 834 into cavity 860. Because the compartment 820 is separated from the compartments 822 and 824, the oil is directed by one of the walls 830g or 830h causing the oil through opening 834. This significantly reduces the windage of the oil, and reduces the internal friction of the oil.

First scavenge pump 808 (FIG. 29) includes an oil pickup line 876 in first cavity 860 (FIG. 30), as described herein. Other drainage includes drainage through opening 878 which drains into the pump area (see FIG. 29) and then transfers into the cavity 862 (see FIG. 30) through opening 864. Second scavenge pump 810 (FIG. 29) includes an oil pickup line 880 in second cavity 862 (FIG. 30). First and second scavenge pumps pickup through oil pickups 876 and 880 and discharge through oil line 890 (FIG. 30).

Compartment 824 is the dry sump storage for the lubrication system 800. The normal oil level in the dry sump compartment 824 would be just under a discharge end 892 of the oil line 890. Finally a siphon 900 (FIG. 30) is positioned in the compartment 824 and siphons oil into the first stage of the oil pump 804. It should be appreciated, that not all of the drainage is shown in FIGS. 29 and 30, as only one of the crankcase halves is shown. For example, the crankshaft main bearings are located with one in the crankcase half 20A and the other through the crankcase half 20B, and therefore they drain through their respective halves. However, all of the oil drains to one of the two cavities 860 and 862 and is picked up by the scavenge stages of pump 804. Thus an infinite number of drainage scenarios exist from the engine and transmission components, leading back to one or both of the cavities 860 and 862.

However, with reference to FIG. 31, the lubrication system 800 is shown in schematic form which shows pressure pump 806 delivering oil on the pressure side, through pickup 900. It also shows the scavenge pumps 808, 810 scavenging from cavities 860, 862 respectively. FIG. 31 also shows to which components the oils lines 812 and 814 deliver oil. The drainage patterns are shown geometrically, where the drainage to the first cavity 860 is shown by the symbol "●" and the return to the second cavity is shown by the symbol "■". As shown, the oil line 814 delivers oil generally to the transmission (input and output shaft) while oil line 812 delivers oil first to the alternating current generator (ACG) and engine main bearing. Each of these bearings have some oil that is drained to cavity 860 or 862, and some oil that is sent on to further components.

The lubrication system of the present disclosure could have features similar to that shown and described in U.S. patent application Ser. No. 13/242,239 filed Sep. 23, 2011 (US Publication Number 20120073527), the subject matter of which is incorporated herein by reference. The difference is that the lubrication system also feeds the transmission shaft for the transmission.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. An engine, comprising:
   a crankcase;
   a crankshaft journaled in the crankcase;
   a piston coupled to the crankshaft;
   a cylinder in which the piston reciprocates,
   a head positioned over the piston and cylinder;
   a valve cover receivable over the head; and
   a blow-by gas outlet distinct from and removably coupled to the valve cover and communicating through the valve cover, the head, the cylinder and the crankcase to exhaust blow-by gas from the crankcase.

2. The engine of claim 1, wherein the crankcase has a crankcase wall with a drive end of the crankshaft extending though the crankcase wall, with a first gear coupled to the crankshaft on an outside of the crankcase wall.

3. An engine, comprising:
   a crankcase;
   a crankshaft journaled in the crankcase;
   a piston coupled to the crankshaft;
   a cylinder in which the piston reciprocates;
   a head positioned over the piston and cylinder;
   a valve cover receivable over the head; and
   a blow-by gas outlet coupled to the valve cover and communicating through the valve cover, the head, the cylinder and the crankcase to exhaust blow-by gas from the crankcase, wherein the crankcase wall includes an exhaust opening through the crankcase wall.

4. The engine of claim 3, wherein a cover is coupled over the crankcase wall and the first gear to define an enclosure.

5. The engine of claim 4, further comprising a reed valve coupled to the crankcase wall and covering the exhaust opening.

6. The engine of claim 1, wherein the engine has at least two V-configured cylinders.

7. The engine of claim 6, wherein the engine is a motorcycle V-twin, with a front cylinder and a rear cylinder, each having a valve cover.

8. The engine of claim 7, wherein the crankcase has a common chamber for the blow-by gas of both the front and rear cylinders.

9. The engine of claim 8, wherein the blow-by gas outlet is positioned at a rear edge of the rear valve cover.

10. An engine, comprising:
    a crankcase having a crankcase wall and an exhaust opening through the crankcase wall;
    a crankshaft journaled in the crankcase;
    a piston coupled to the crankshaft;
    a cylinder in which the piston reciprocates,
    a head positioned over the piston and cylinder;
    a valve cover receivable over the head; and
    a channel defined through the valve cover, the head, the cylinder and the crankcase to exhaust blow-by gas from the crankcase.

11. The engine of claim 10, wherein the crankcase includes an upper planar surface have an opening therethrough.

12. The engine of claim 11, wherein the cylinder is coupled to the crankcase upper planar surface and a connecting rod couples the piston and crankshaft through the opening.

13. The engine of claim 11, wherein the crankcase includes a first aperture therethrough, through the upper planar surface.

14. The engine of claim 13, wherein the cylinder includes an upper planar surface, and a lower planar surface for positioning adjacent to the crankcase upper planar surface.

15. The engine of claim 14, wherein the cylinder includes a second aperture extending between the upper and lower planar surfaces of the cylinder and aligned with the first aperture.

16. The engine of claim 15, wherein the head includes a third aperture extending between an upper planar surface and a lower planar surface of the head and aligned with the second aperture.

17. The engine of claim 16, wherein the valve cover includes a fourth aperture extending between an upper planar surface and a lower planar surface of the valve cover and aligned with the third aperture.

18. The engine of claim 17, wherein a blow-by gas outlet is coupled to the upper planar surface of the valve cover and communicating with the crankcase through the first, second, third and fourth apertures.

19. The engine of claim 18, wherein engine has at least two V-configured cylinders.

20. The engine of claim 19, wherein the engine is a motorcycle V-twin, with a front cylinder and a rear cylinder, each having a valve cover.

21. The engine of claim 20, wherein the crankcase has a common chamber for the blow-by gas of both the front and rear cylinders.

22. The engine of claim 21, wherein the blow-by gas outlet is positioned at a rear edge of the rear valve cover.

23. The engine of claim 10, wherein a drive end of the crankshaft extending though the crankcase wall, with a first gear coupled to the crankshaft on an outside of the crankcase wall.

24. The engine of claim 23, wherein a cover is coupled over the crankcase wall and the first gear to define an enclosure.

25. The engine of claim 24, further comprising a reed valve coupled to the crankcase wall and covering the exhaust opening.

26. The engine of claim 25, wherein the engine has at least two V-configured cylinders.

27. The engine of claim 26, wherein the engine is a motorcycle V-twin, with a front cylinder and a rear cylinder, each having a valve cover.

28. The engine of claim 27, wherein the crankcase has a common chamber for the blow-by gas of both the front and rear cylinders.

29. The engine of claim 28, wherein the blow-by gas outlet is positioned at a rear edge of the rear valve cover.

30. The engine of claim 1, wherein the valve cover includes an interface surrounding a port and the blow-by gas outlet is coupled to the valve cover at the interface.

31. The engine of claim 7, wherein the blow-by gas outlet is coupled to the valve cover of the rear cylinder and the blow-by gas of the front cylinder is exhausted only through the blow-by gas outlet.

* * * * *